Aug. 21, 1928.  1,681,244
A. LATHAM
MACHINE FOR ASSEMBLING AND MOUNTING ARTICLES
Filed Nov. 12, 1921   15 Sheets-Sheet 9
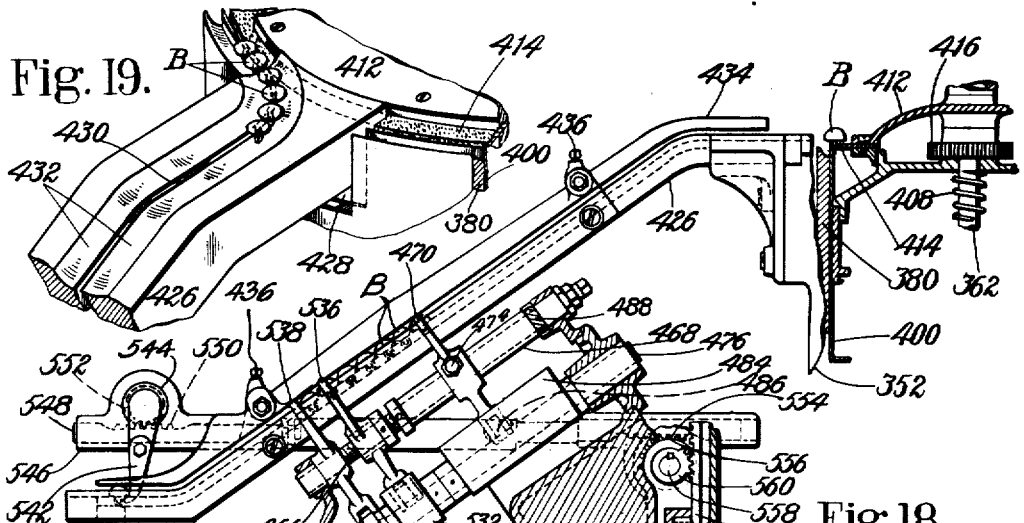
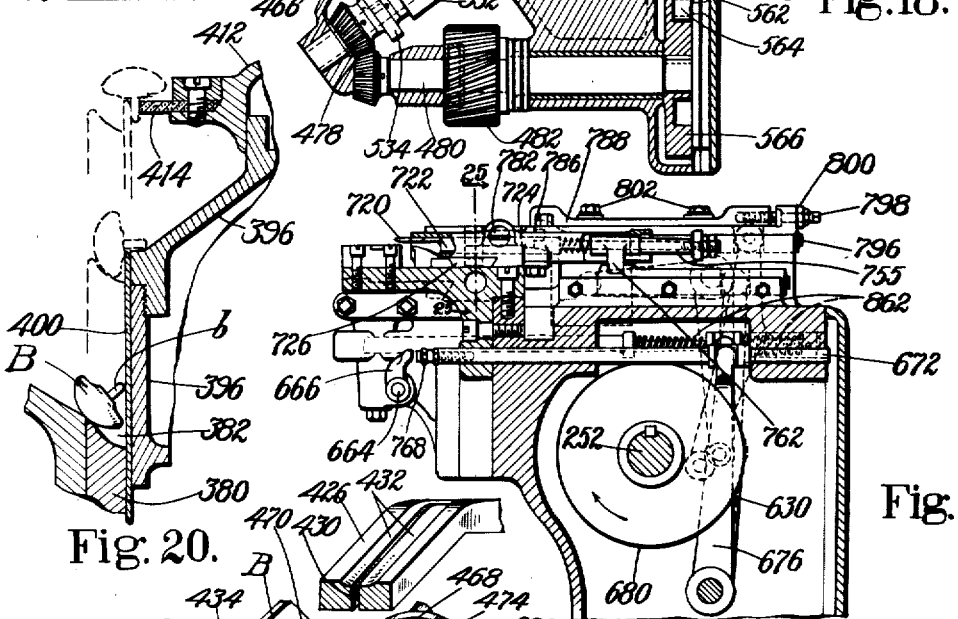
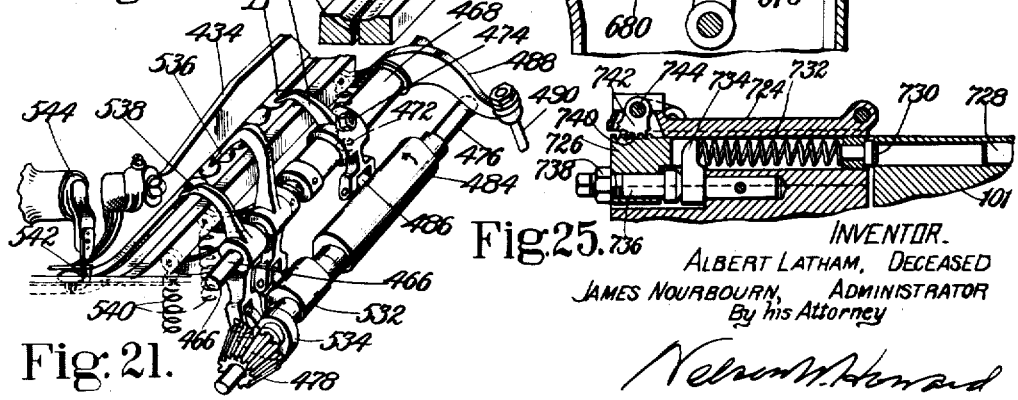
INVENTOR.
ALBERT LATHAM, DECEASED
JAMES NOURBOURN, ADMINISTRATOR
By his Attorney

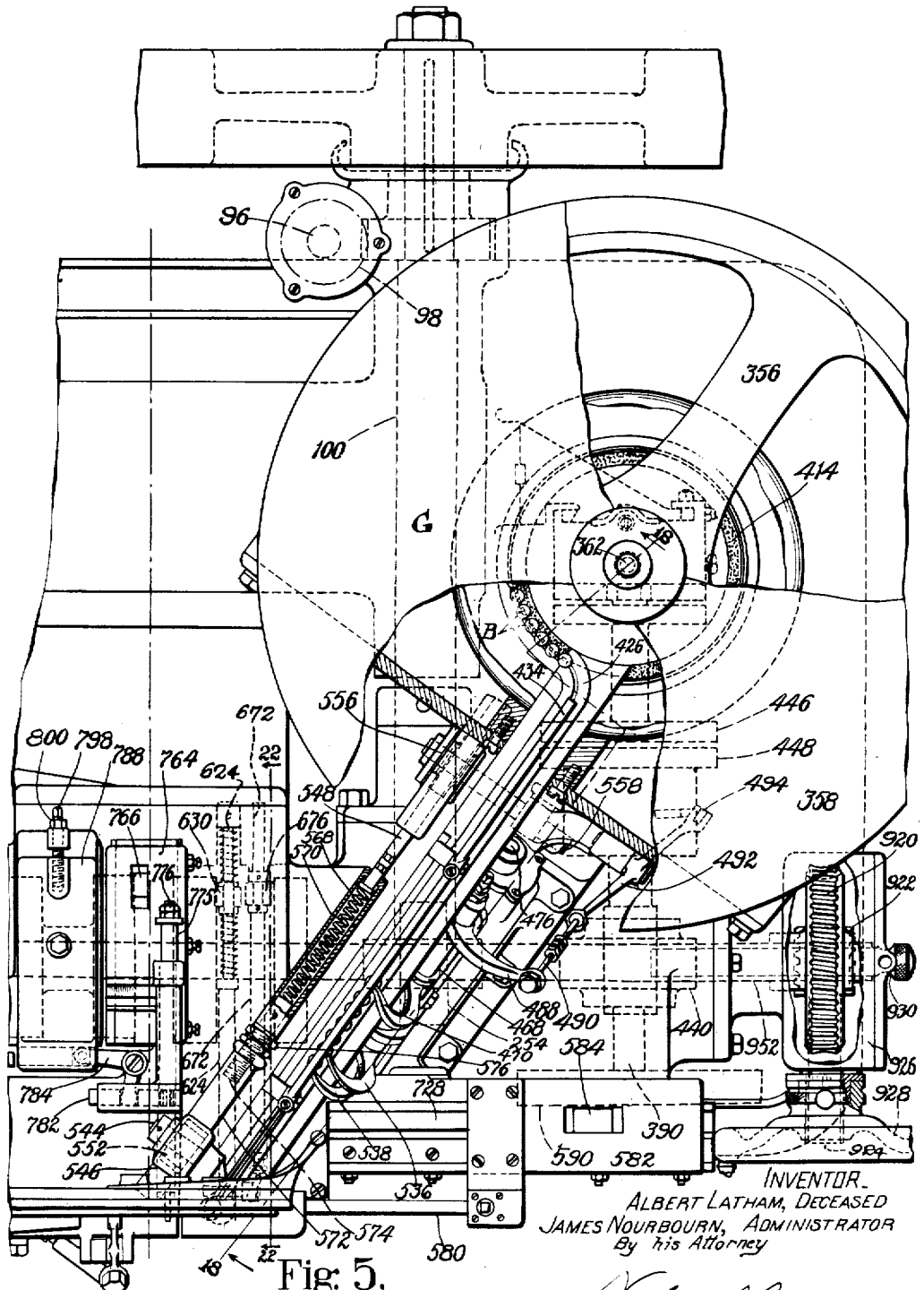

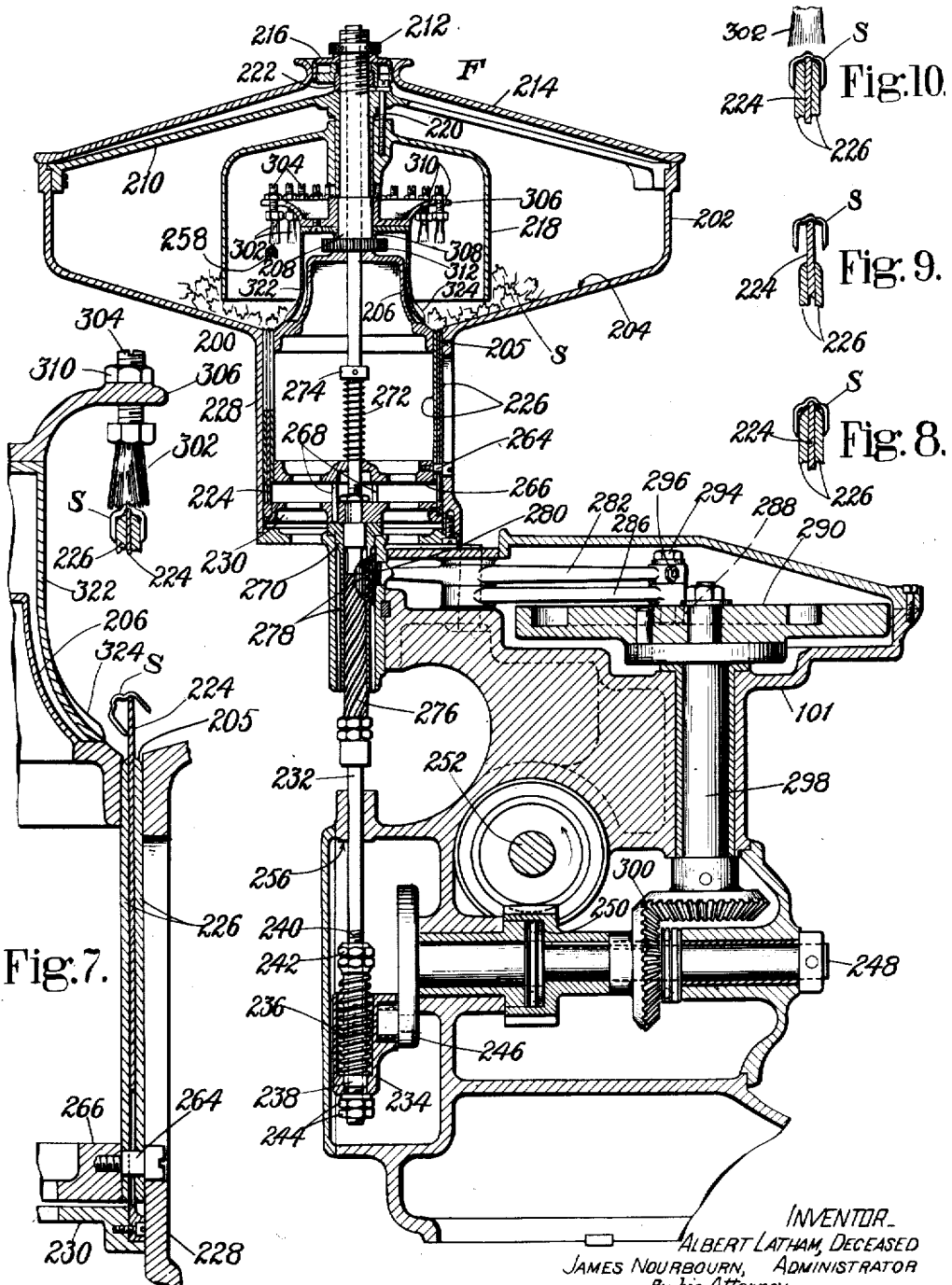

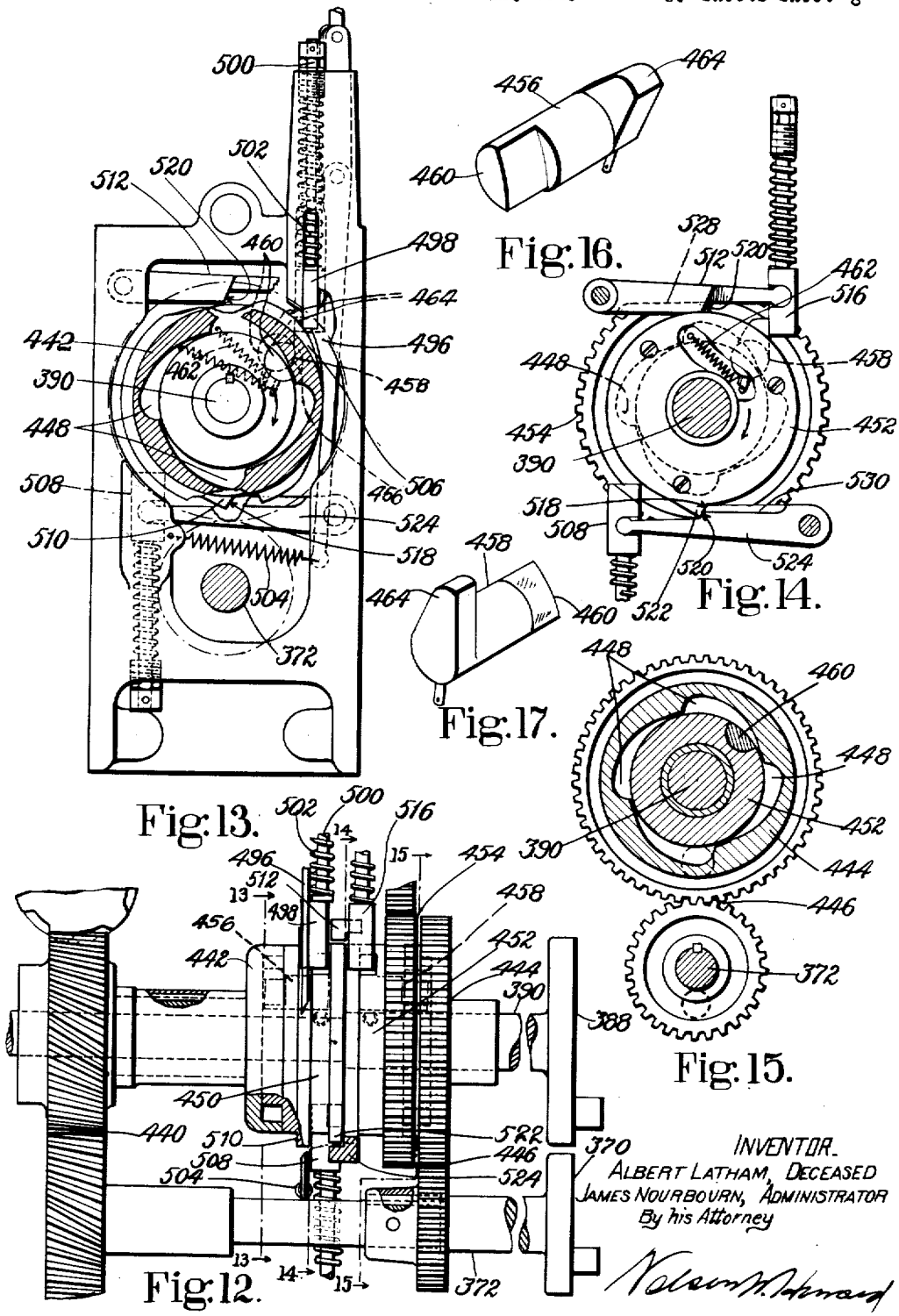

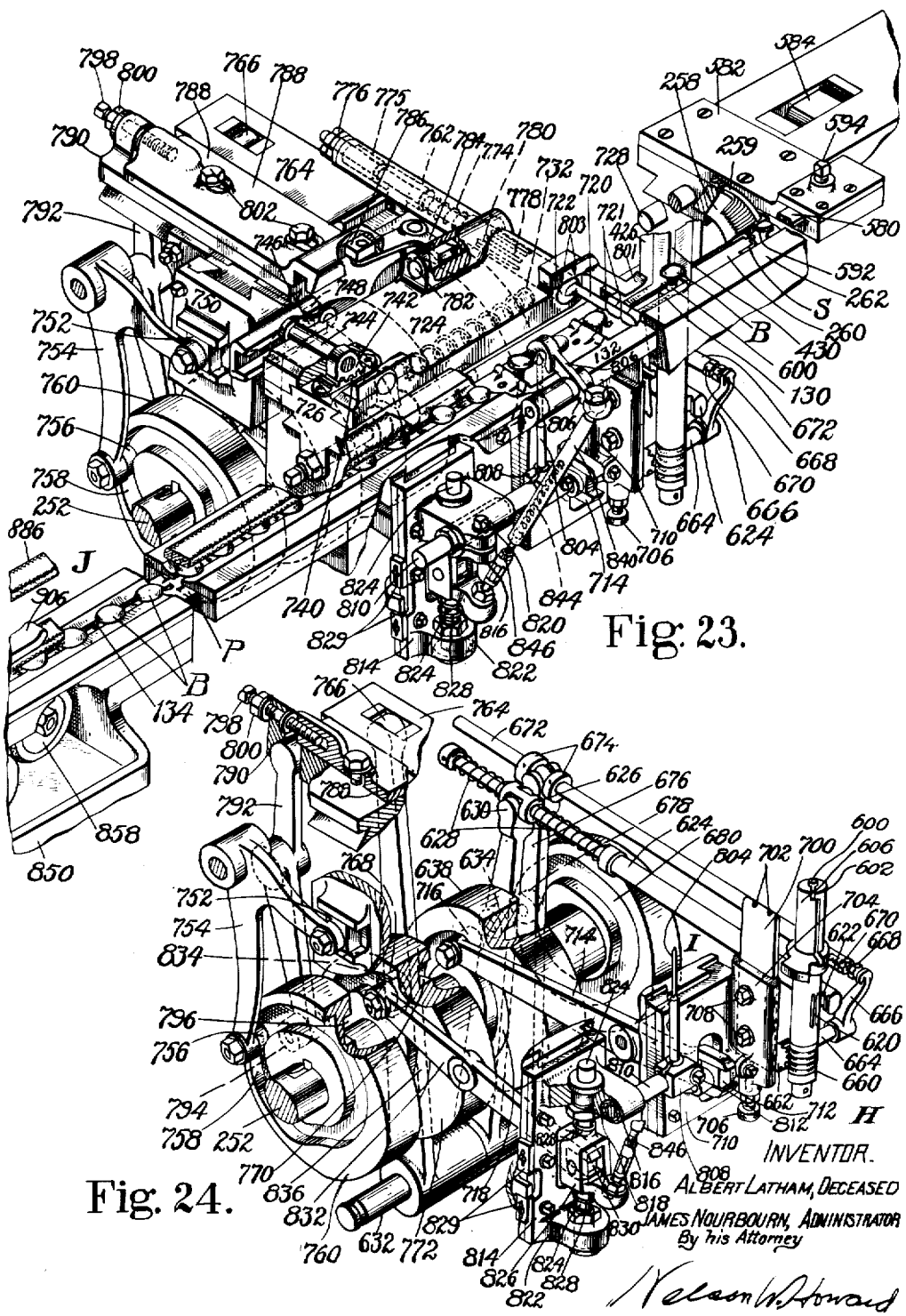

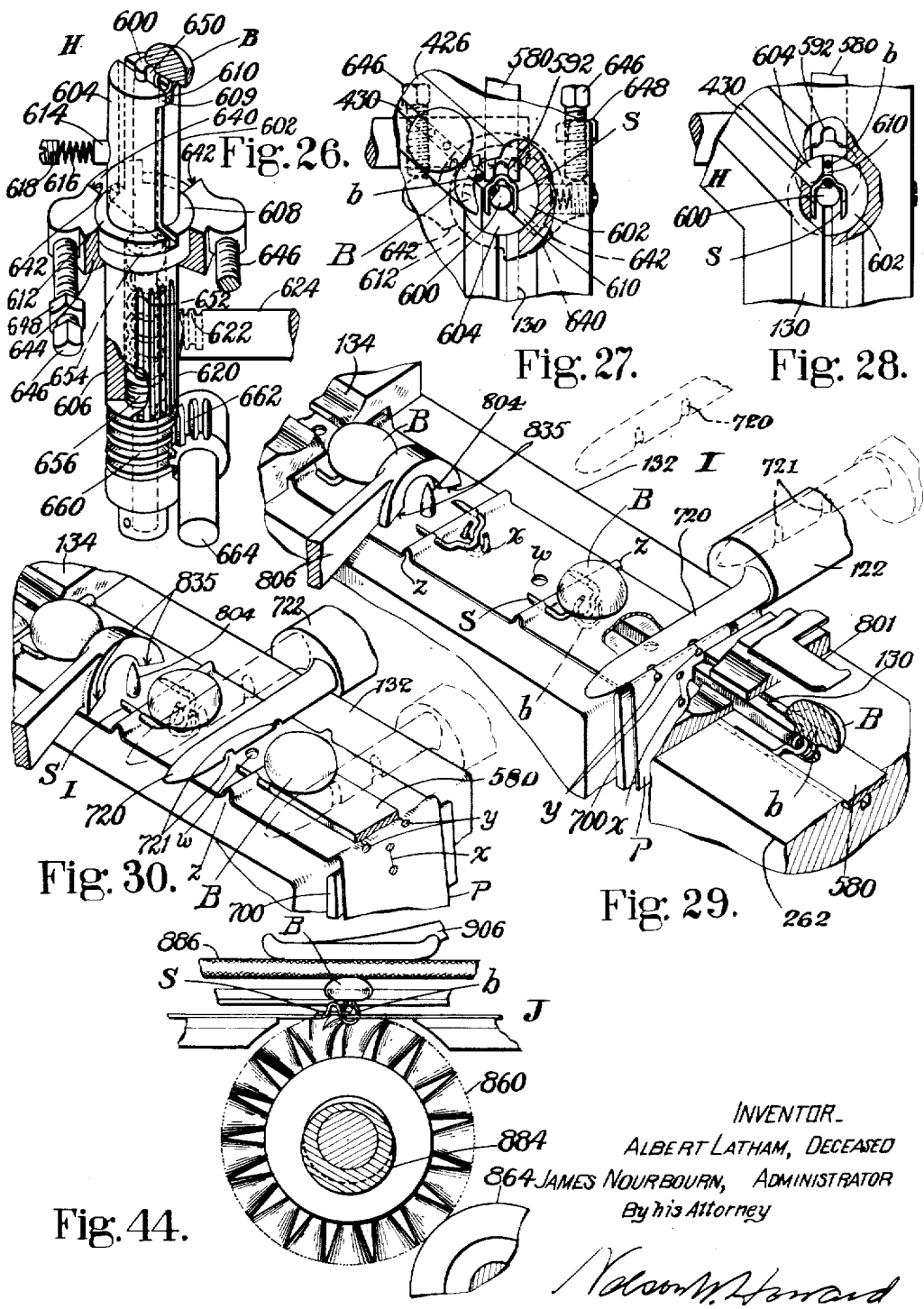

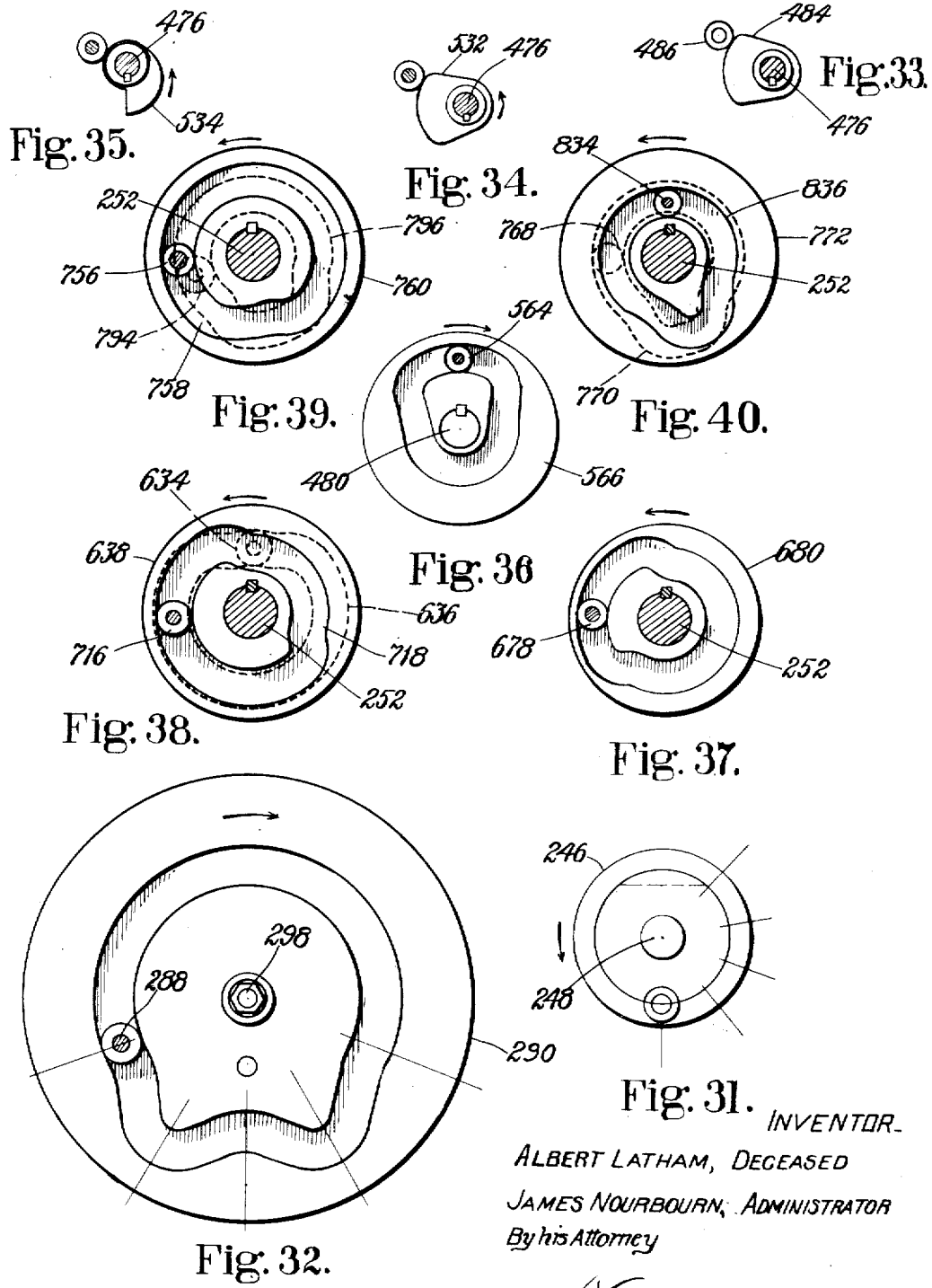

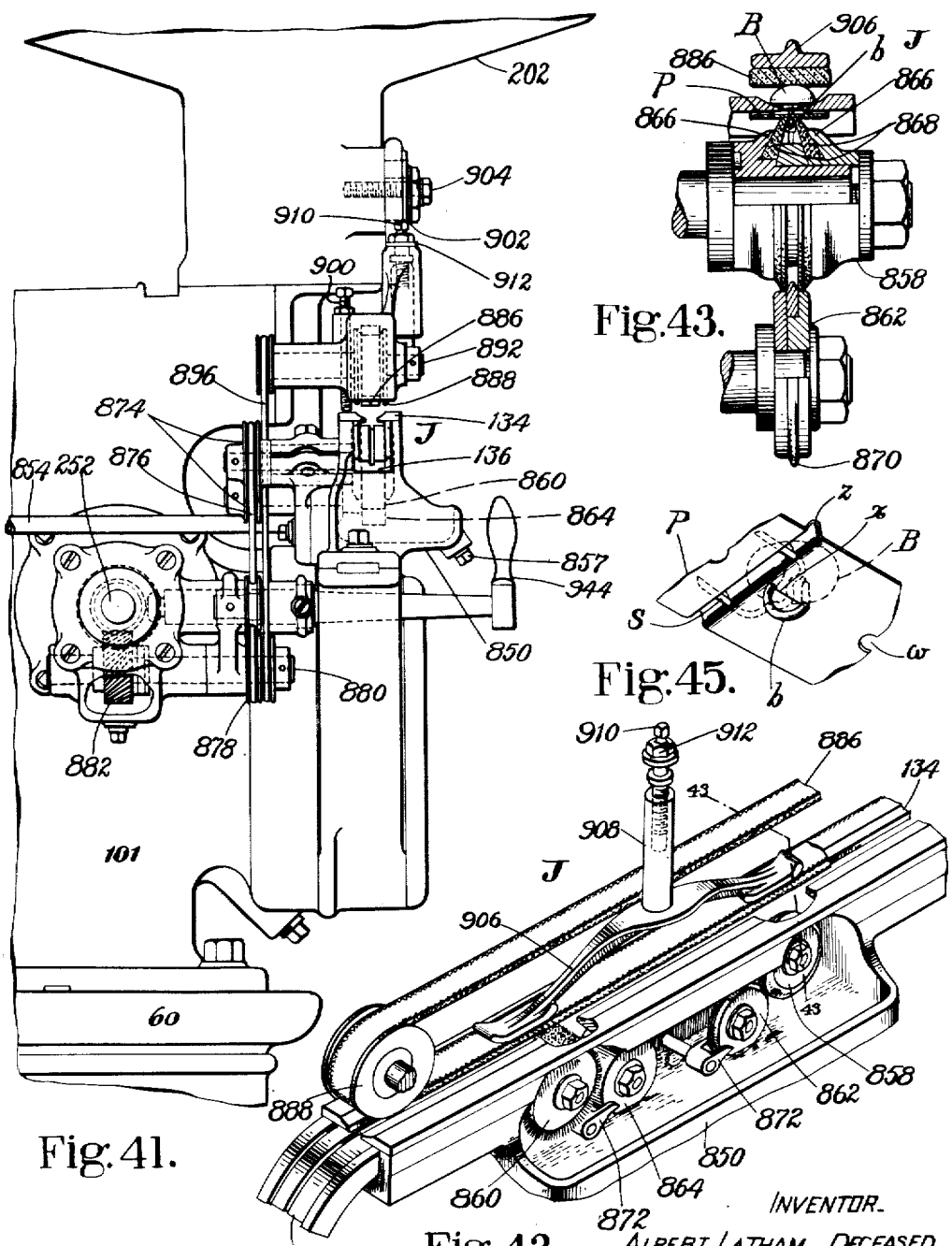

INVENTOR.
ALBERT LATHAM, DECEASED
JAMES NOURBOURN, ADMINISTRATOR
By his Attorney Patented Aug. 21, 1928.

1,681,244

UNITED STATES PATENT OFFICE.

ALBERT LATHAM, DECEASED, LATE OF BEVERLY, MASSACHUSETTS, BY JAMES W. NOURBOURN, ADMINISTRATOR, OF SOMERVILLE, MASSACHUSETTS, ASSIGNOR TO AMERICAN BUTTON & FASTENER CO., OF AUGUSTA, MAINE, A CORPORATION OF MAINE.

MACHINE FOR ASSEMBLING AND MOUNTING ARTICLES.

Application filed November 12, 1921. Serial No. 514,621.

This invention relates to machines of the general character of that disclosed in a patent granted in the name of William E. Elliott on January 29, 1924, No. 1,482,120, which machine is especially designed for arranging various articles, as buttons and the staples by which they are to be secured, upon a temporary holder-strip to furnish such a package as is illustrated in the Patent No. 1,147,382, Elliott, July 20, 1915, the contents of which package may be utilized in a button-setting machine. In the Elliott apparatus, the buttons and staples are supplied for the mounting operation in magazines in which they are already assembled; that is, with the staples threaded through the eyes of the buttons which they are to attach. An object of the present invention is to assemble the articles in connection with the mounting operation. When buttons and staples are being operated upon, they are best contained, respectively, in masses within suitable receptacles, from which they are automatically fed in the desired quantities and, when necessary, controlled as to the time of delivery, brought together in pairs of buttons and staples ready for attachment, and these pairs applied to the holder. The invention also preferably provides for a more effective mounting and securing of the fasteners in place upon the holder-strip, and advancing of the strip to the assembling and mounting mechanism and maintaining it under proper tension.

In the attainment of these objects, a feature of the invention consists in novel means for assembling the articles in engagement with one another to furnish a group or pair, and co-operating means for mounting the thus assembled group upon a holder, so that it is readily removable therefrom for utilization. To permit successive groups to be applied to the holder, feeding means may co-operate with the mounting means to cause the presentation thereto of different fastener-receiving areas. After the mounting of the articles, there is brought into operation a member for sealing or otherwise fixing them in place, preferably by action of said member both upon the holder and articles. In accomplishing this sealing, there is herein disclosed means for pressing the holder into co-operation with the articles, and for applying an adhesive liquid. The assembling means for buttons and staples is organized to thread the staple-legs through the button-eyes, both the thus related fastening devices thereafter being brought into retaining engagement with the holder-strip.

When certain articles are to be applied, particularly staples, the strip may have such previously formed portions as corrugations furnishing an effective mounting; and with such a holder may be provided, as a feature of the invention, means for preserving the form of the portions. Form-preserving means are shown, which both enter the previously formed corrugations, as during the mounting operation, and which act during the feeding of the holder-strip from position to position, the former means maintaining the corrugations against the pressure of the mounting instrumentalities, and the latter preventing the tension which is applied to the strip during its advance from pulling out or flattening said corrugations. As to the form-preserving means effective during feed, it may include an article-applying member, which travels forward with the strip after the mounting of an article has been accomplished, and a support over which the feed occurs, a movable strip-retaining member co-operating with both these agencies. More specifically, the form-preserving means includes a bar entering a corrugation during the mounting operation, an article-applying bar which effects the mounting; and a retaining finger which co-operates with the entering bar during article-application, and then with both the applying bar and support during feed, the applying bar pressing the strip against the finger as the two move forward together, and the finger at the same time forcing the strip against the support. It is to be observed that during both the mounting and feeding operations there are shown, in the present instance, members movable into contact with opposite sides of the strip to clamp it between them.

To permit the retaining member or finger to perform its functions, it has imparted to it, as another feature of the invention, a compound action, which may include, in various novel combinations, movement with the support in its advance, preferably in steps of different lengths; into and out of co-operation with the strip; and into and out of co-operation with an article on the strip. There is herein disclosed a bodily advance of the retaining member longitudinally of the strip in a relatively long step in the accomplishment of the form-preserving effect upon the corrugations; a similar movement of less extent, this, combined with a rotation about its axis, freeing it from the mounted articles; and a movement longitudinally of its axis and transversely of the strip to permit return to normal without interference with the strip after the long and short forward steps. One of the movements of the retaining member may be imparted by the action upon it of the article-applying member, which is shown as arranged to act upon a supporting slide of said retaining member. This support, which may be termed the primary slide, carries, in the present embodiment of the invention, a secondary slide, actuated to produce the long steps of the retaining member. There also appears an auxiliary slide co-operating with the member to rotate it.

As has already been indicated, in the formation of a package of articles, a liquid is preferably applied, both to the holder and articles; and to best attain the desired sealing action, a feature of this invention involves means for applying the liquid in proximity to the articles, together with means for applying said liquid over a more extended surface, such means preferably operating in a liquid container. The first-mentioned applying means, which may be employed without the cooperating applying means, if desired, has, as illustrated, separated portions which contact with the holder at opposite sides of projecting portions of the articles. Such an arrangement serves both to coat the adjacent portions of the holder and articles, and also to press the holder into co-operation with said articles, this last-mentioned action being effected, if desired, by a contact member, without the application of liquid. The holder, in the present embodiment of the invention, is moved in co-operation with the member or members to receive the liquid or the pressure of the contact member; and there is shown traveling with it a member which retains the holder in position for such action. More specifically, the means for applying the liquid in proximity to the articles may consist of yieldable disks converging toward one another to furnish applying edges, these, when utilized for the sealing of buttons in their package-strip, serving to coat with an adhesive the portions of the button-eyes which project through the strip, and to press the material of the strip into the eye-opening. The traveling retaining member is best furnished by a belt.

As still another feature of the invention, the proper presentation of the holder-strip to the mechanism for operating upon it, as the means for mounting the articles, is provied for in a novel manner. These articles are to be disposed along the strip, in definite spaced relation, at areas in which are openings, and great precision in the strip movement is attained by having feeding means engaging the openings and acting to advance the strip in steps equal to the spaces between the openings. These uniform successive feeding movements are shown as obtained by co-operating members, one having definitely spaced projections, and another provided with a movable detent, together with means for controlling the engagement of the detent and projections. At the opposite side of the operating mechanism from the feeding means is located means for placing the holder-strip under tension to take up the slack caused by its advance. This tension means preferably consists of a reel, with friction means for rotating it, this arrangement allowing the parts to slip before the pull upon the strip becomes excessive. The reel herein appears as being mounted for reciprocation longitudinally of its axis, there being means for producing this movement to dispose the strip symmetrically about the reel.

At the time at which the mounting mechanism acts to apply the articles to the holder, said holder must be located accurately to insure the equal spacing which is essential to the effective utilization of the mounted articles from the package. With this end in view, an additional feature of this invention brings into co-operation with the means for moving the holder to advance different areas into the field of action of the applying mechanism, a further means arranged to move the holder to present the co-operating areas in correct relation to the applying means. As previously explained, the article holder of the present invention is provided with an opening at each area which receives the articles, and movable into this opening is a holder-retaining member, as a pin, which not only maintains it in the desired position, but also may exert a lateral pressure to produce a correcting movement. There is also preferably associated with this retaining and positioning member, means, shown as an arm movable with the retaining member, for clamping the positioned holder, so that it will not be displaced during the mounting operation.

Other features of the invention will hereinafter be developed.

A particular embodiment of the invention is illustrated in the accompanying drawings. Here, Fig. 1 shows the improved machine in general outline, the strip-supplying, advancing and winding mechanisms being included;

Figs. 2 and 3, when taken together, with Fig. 2 at the left, furnish a front elevation of the machine, with parts broken away;

Figs. 4 and 5, similarly related, with Fig. 4 at the left, present a top plan view;

Fig. 6 is a vertical section through the staple-feeder on the line 6—6 of Fig. 4;

Fig. 7 is an enlarged vertical, sectional detail through one side of said feeding mechanism;

Figs. 8, 9 and 10 are sectional details of the cooperating edges of the feeding cylinders, showing them in successive positions;

Fig. 12 is a broken side elevation of the clutch mechanism for controlling the button-feeding cylinders;

Figure 4:
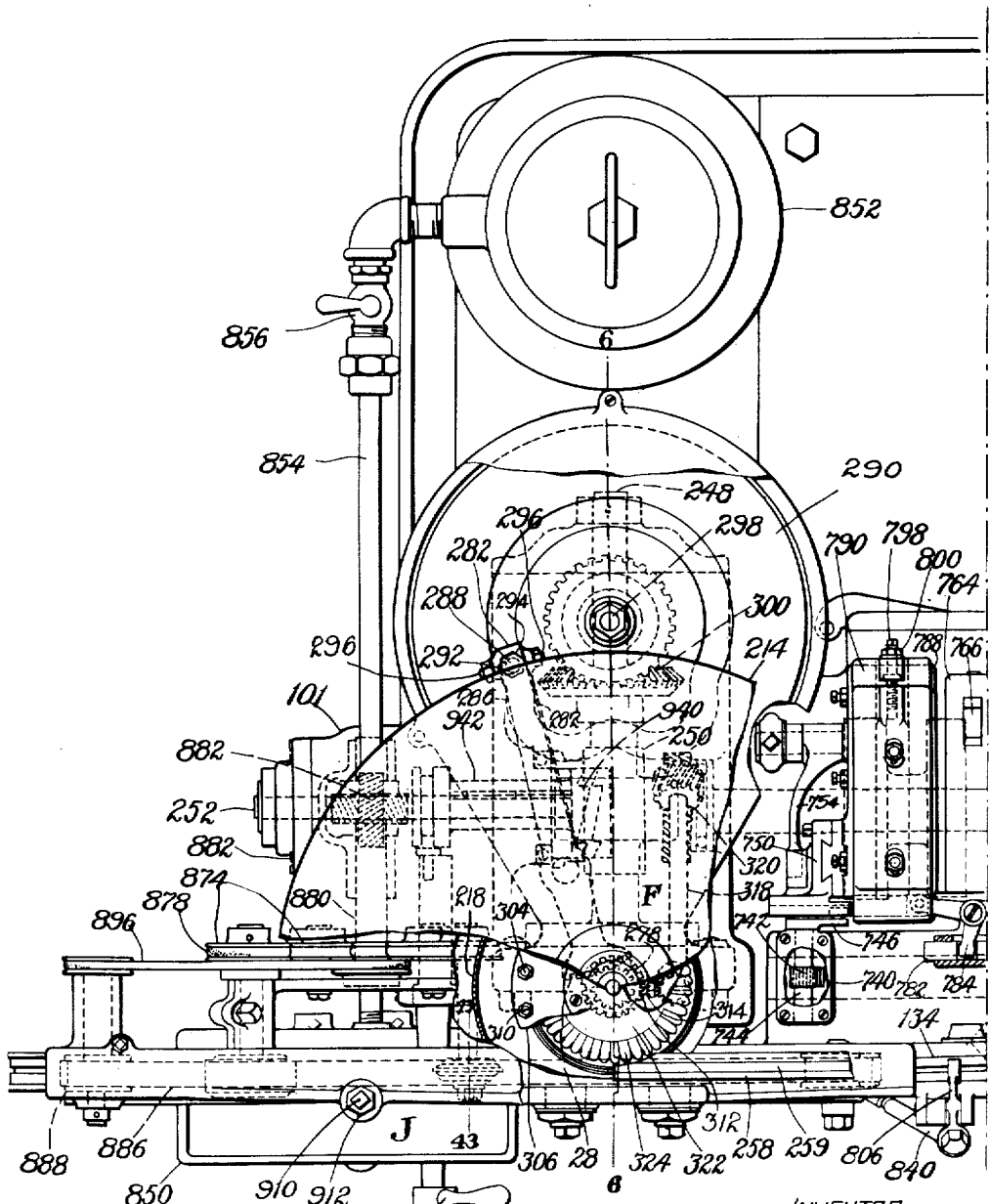
Figure 46:
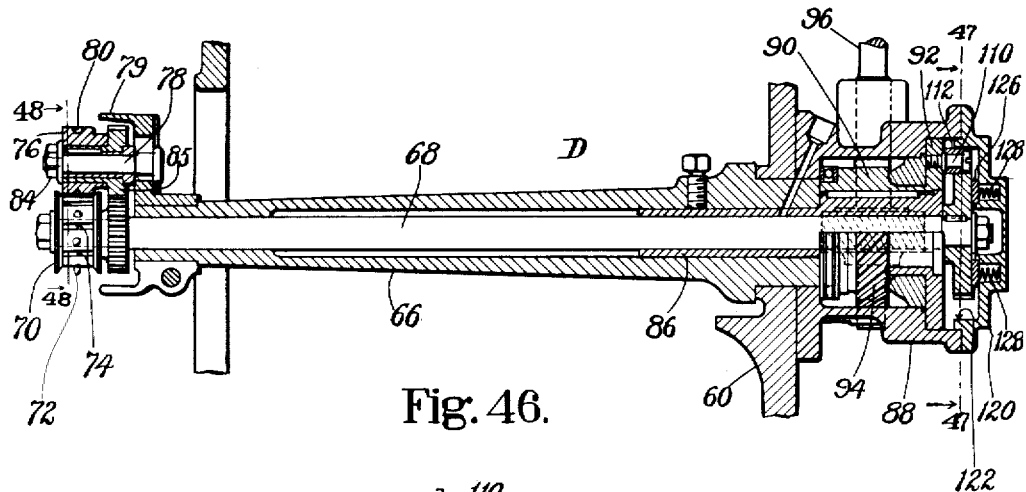
Figure 47:
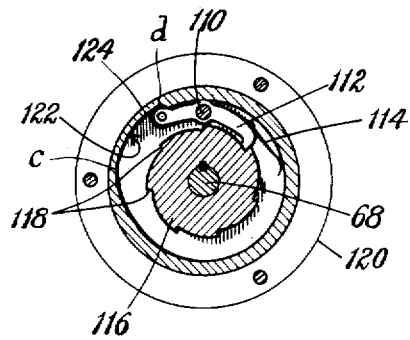
Figure 48:
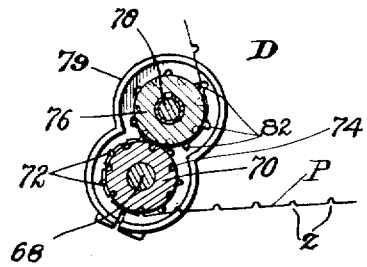
Figure 49:
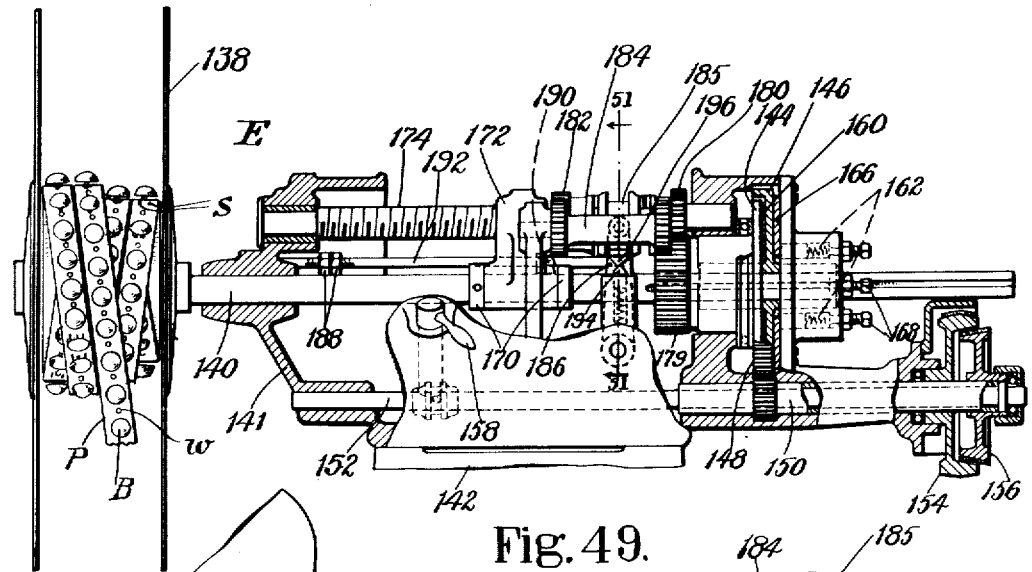
Figure 50:
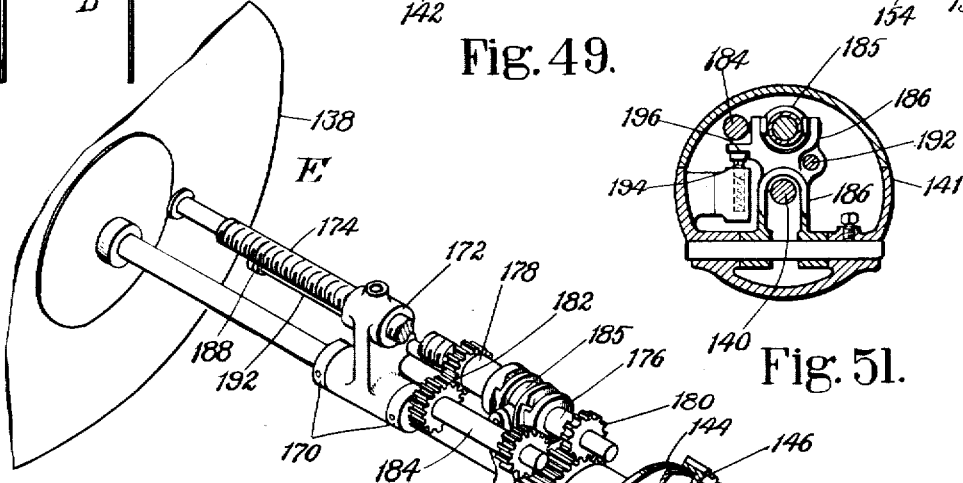

Figs. 13, 14 and 15 are transverse sections on the lines 13—13, 14—14 and 15—15, respectively, of Fig. 12;

Figs. 16 and 17 show in perspective the connecting devices for the two portions of the clutch mechanism of Fig. 12;

Fig. 18 is a vertical section on the line 18—18 of Fig. 5;

Fig. 19 illustrates in perspective the upper portion of the button-race-way, with the cooperating elevating cylinders;

Fig. 20 gives, in enlarged vertical section, three successive positions of the elevating cylinders;

Fig. 21 is a perspective view of the lower portion of the button-race-way and co-operating button-controlling fingers;

Fig. 22 is a vertical section on the line 22—22 of Fig. 5;

Figs. 23 and 24 exhibit in perspective the assembling and mounting mechanisms, Fig. 24 showing particularly the actuating means therefor;

Fig. 25 is a sectional detail on the line 25—25 of Fig. 22;

Fig. 26 is a perspective view of the more essential portions of the assembling mechanism;

Figs. 27 and 28 are details in top plan of said mechanism, illustrating successive positions thereof;

Figs. 29 and 30 are perspective views of the work-engaging elements of the mounting mechanism, illustrating different positions of the elements;

Figs. 31 to 40, inclusive, show various cams for imparting movement to parts of the machine;

Fig. 41 is a detail in elevation, looking from the left in Fig. 4, and illustrating particularly the sizing mechanism;

Fig. 42 is a broken perspective view of said sizing mechanism;

Fig. 43 shows a transverse sectional detail on the line 43—43 of Fig. 42;

Fig. 44 (Sheet 11) is an enlarged vertical section taken through the adjusting means of the size-applying brush;

Fig. 45 illustrates a portion of the holder-strip with a button and staple mounted thereon, showing the relation of the parts after they have been subjected to the action of the sizing mechanism;

Fig. 46 is a longitudinal, sectional detail through the strip-advancing mechanism;

Fig. 47 is a vertical section on the line 47—47 of Fig. 46;

Fig. 48 is a vertical section on the line 48—48 of Fig. 46;

Fig. 49 shows the winding mechanism in front elevation, with parts broken away;

Fig. 50 is a perspective view of portions of the winding mechanism; and

Figure 51:
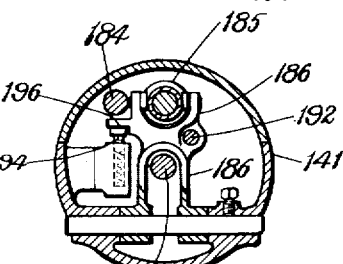

Fig. 51 is a vertical, sectional detail on the line 51—51 of Fig. 49.

*Purpose and general organization of the machine.*

To give first an idea of the general purpose and arrangement of the machine, it is especially designed for mounting such fastening devices as buttons B, of the type having an eye-shank $b$, with their attaching devices, as a staple S passed through the eye of each button, upon a holder-strip P, which may be of some such flexible material as paper, the buttons and their associated staples being spaced upon the strip at regular intervals and occupying predetermined positions. It is preferable to employ for the mounting strip one which has previously been prepared, as is illustrated in Figs. 29, 30 and 45 of the drawings, it having strip-feeding and locating openings $w$, button-eye-receiving openings $x$, and adjacent pairs of openings $y$, $y$ to receive the staple-legs, these last-mentioned openings extending through the sides of corrugations $z$ formed transversely of the strip. These openings and corrugations are arranged longitudinally of the strip in a series of identical groups, between the adjacent groups of which there is the same mean or pitch distance. There is furnished by this organization a convenient package, from which the contents may be delivered effectively to an attaching machine for securing the buttons by their staples to the work, as the tops of shoes or gaiters for which they are to provide fastenings. To produce this package, the improved machine includes, grouped (Fig. 1) on or about a frame A, a strip-supplying reel C, strip-advancing mechanism D, strip-winding mechanism E, staple-feeding mechanism F, button-feeding mechanism G, button and staple-assembling mechanism H, button and staple-mounting mechanism I, and sizing and sealing mechanism J. The previously prepared strip is drawn intermittently from the reel C by the advancing mechanism D in lengths equal to the pitch distance between the button and staple positions. By this feeding action, and as a result of a constant tension maintained upon the forward end of the strip by the winding mechanism E which receives it, said strip is carried in regular steps through the assembling, mounting and sealing mechanisms. In the assembling mechanism H, for each step, a staple from the feeder F is thrust through the eye of a button from the feeder G. In the mounting mechanism I, the strip is correctly located and clamped, and the asembled button and staple positioned and their placing upon the strip effected. Then, as the strip upon the succeeding advance traverses the mechanism J, the edges of the openings $x$ are pressed into place about the button-eyes $b$, and a coating of a stiffening adhesive liquid is applied to the under side of the strip and to the projecting portions of the button-eye and staple-legs to retain them securely upon the holder.

*Strip-advancing and package-receiving mechanisms.*

The frame A of the machine includes a base-section 60 (Fig. 1), having projecting from one side a bracket 62, in which is journaled a spindle 64 for the reel C of prepared paper mounting strip P. The reel is preferably retarded in its rotation by a suitable friction-brake (not shown). Extending from the front to the rear of the base-section 60 is a horizontal bearing sleeve 66 (Fig. 46), in which is rotatably mounted a shaft 68. At one extremity of this shaft there is fixed a feed-roll 70, from the periphery of which projects tapered pins 72, so spaced from one another about the roll that they will successively engage the openings $w$ to positively draw the strip P from the reel C and feed it forward in steps equal to the distance between the openings and pins. Between the pins 72 are transverse depressions 74, within which the corrugations $z$ may lie during the feeding operation without becoming distorted. With the roll 70 co-operates a pressure-roll 76, carried upon a spindle 78 fixed parallel to the spindle 68 in a casing 79 supported on the sleeve 66, and having depressions 80 in its periphery to receive the pins 72, and longitudinal bars 82, which enter the depressions 74 and the strip-corrugations which occupy them, thus assisting in the feeding and maintaining the form of the corrugations. The roll 76 is preferably adjustable as to its spacing from the companion roll, its spindle being mounted in a slot in the casing 79, in which it is fixed in the desired position by a nut 84 upon the end of the spindle. The rolls are rotated together at the same peripheral speed by pinions 85, 85, one of which is fixed to the spindle 68, while the other is secured to the roll 76.

To intermittently rotate the spindle 78 through a definite angle, which will give the proper advance of the strip, with predetermined intervals of rest sufficient in length to enable the mechanisms H and I to accomplish the assembling and mounting operations, there is fixed in the frame, about the spindle 68 at the end opposite the roll 70, a sleeve 86, which is surrounded by a casing 88 mounted upon the frame. Rotatable about the sleeve 86 is a sleeve 90, having at its outer extremity a flange 92. The rotation of the sleeve 90 is effected by spiral-gearing 94 from a vertical shaft 96, which in turn is rotated through spiral-gearing 98 (Fig. 1) from a power-shaft 100 journaled in an upper frame-section or casing 101. Belt-gearing 102 connects the shaft 100 to a shaft 104 journaled transversely of the base-section 60, the latter shaft being joined by reducing spur-gearing 106 to the shaft of a motor 108, preferably electrical and supported within the base-section 60. Pivoted upon the flange 92 of the sleeve 90 is a detent 112 (Fig. 47), urged by a spring 114 toward the periphery of a disk 116, which is keyed upon the spindle 68. Upon the periphery of the disk 116 are projections or shoulders 118 for engagement by the detent, equally spaced from one another and bearing the same angular relation as do the feeding pins 72. The casing 88 has a cover 120, upon which is a cam-surface 122 contacting with a roll 124 upon the detent 112 opposite the end which may engage the projections 118. The form of the cam-surface is such that while the roll occupies the space between the points $c$ and $d$, the engaging end of the detent may contact with one of the projections 118, while between $d$ and $c$ the cam holds the detent away from the periphery of the disk 116. The interval of engagement is equal to the space between the projections. Consequently, for a portion of each rotation of the sleeve 90, the detent is permitted to contact with one of the teeth 118, and through it turn the spindle 68 and roll 70 by an amount equal to the angular distance between the pins 72, while for the remainder of the rotation the detent is disengaged and the spindle and feed-roll stopped. Thus the strip is advanced to the desired amount by the engagement of the pins 72, and then remains stationary for the operations upon it. To hold the roll 70 against accidental movement during its period of non-rotation, there is associated with it a brake device, which may consist of a friction-disk 126 pressed against the outer face of the disk 116 by helical springs 128 occupying recesses in the cover 120.

Figure 1:
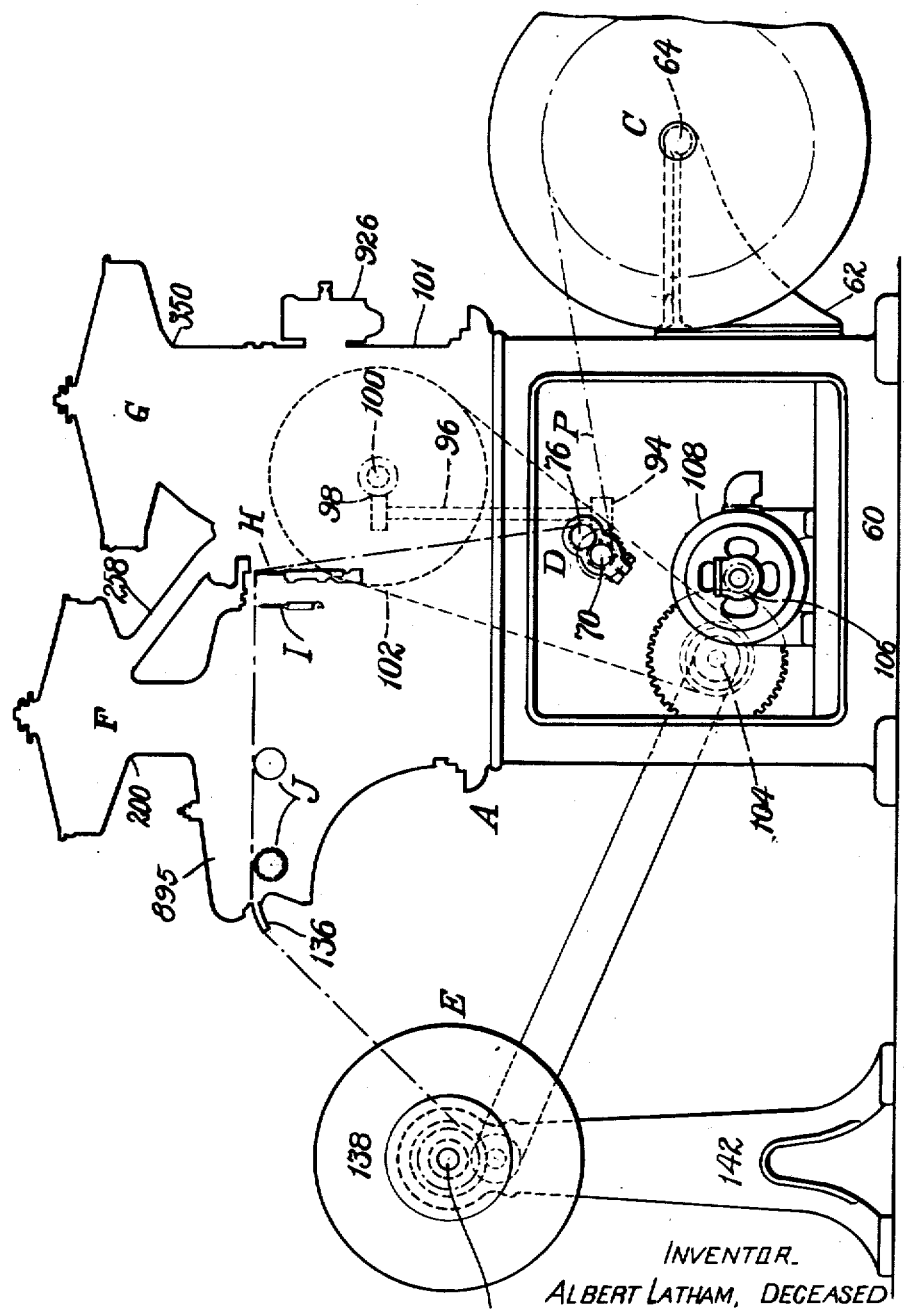
Figure 2:
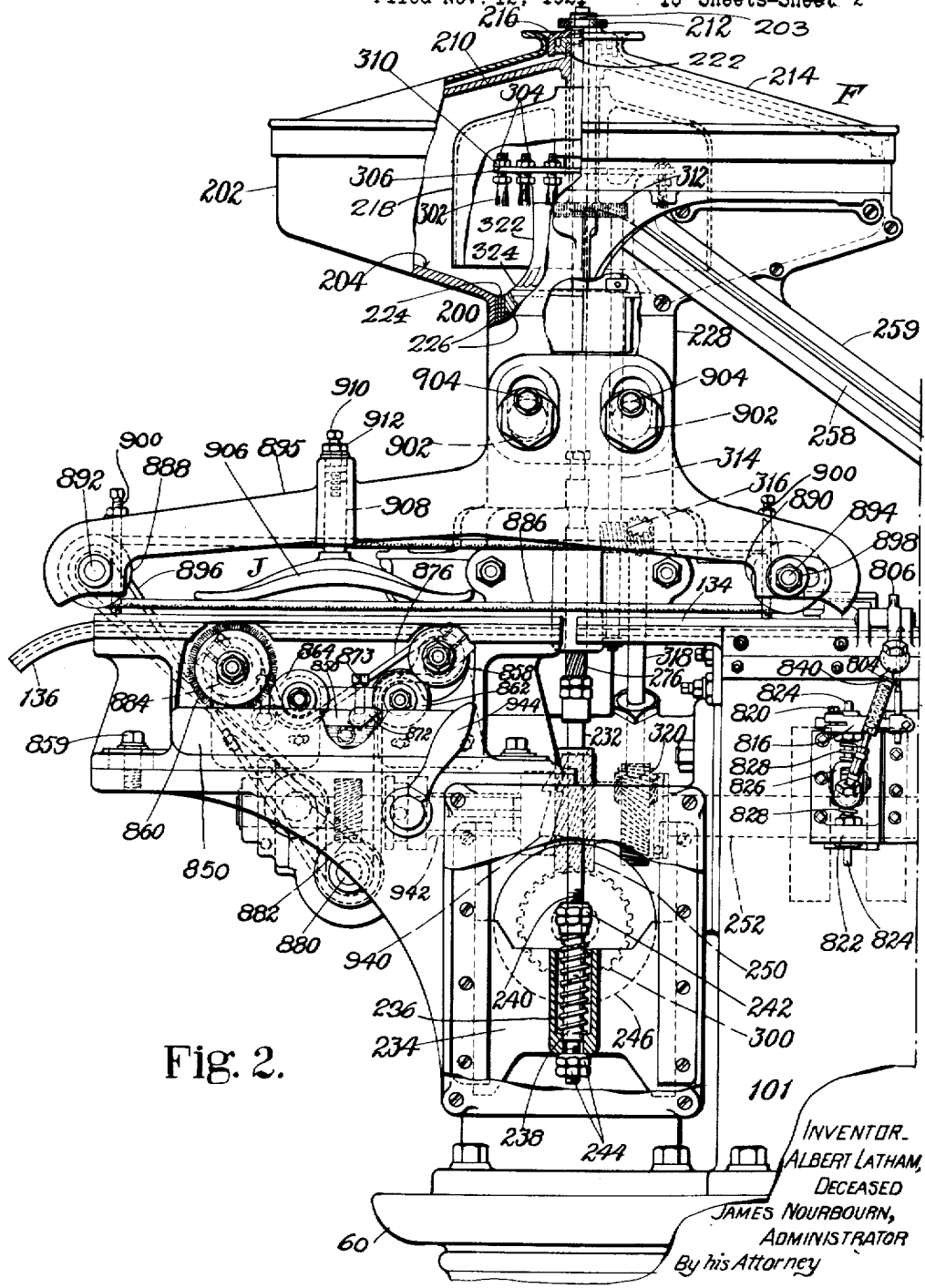

From the feeding rolls, and following the path best seen in Fig. 1, the mounting strip passes between a horizontally extending race-way section 130 (Figs. 28 and 29), which receives the staples and buttons assembled from the feeders F and G by the mechanism H, and an alined table 132, upon which the mounting of the staples and buttons upon the strip is performed, these elements 130 and 132 being included, respectively, in the assembling mechanism H and the mounting mechanism I. From the table 132 the strip enters the horizontal button-support 134 of the sealing mechanism J, which support terminates in a downwardly curved end 136 (Figs. 1 and 42), and is received by a reel 138 of the winding mechanism E (Figs. 1, 49 and 50). To this reel is imparted a movement of rotation, which maintains the strip under constant tension to take up the slack between the reel and the advancing mechanism D, and also a movement of axial reciprocation transverse to the direction of advance, which lays the strip symmetrically upon the winding surface of the reel. It is carried upon a spindle 140 journaled in a casing 141 mounted upon the top of a standard 142 secured adjacent to the frame A. Upon the spindle 140 is splined a disk 144, with which co-operates a disk 146, relatively loose upon the spindle, rotated through spur-gearing 148 from a sleeve 150 arranged to turn in the casing 141 and surrounding a spindle 152 arranged to be moved longitudinally in the casing. Rotatable about the outer extremity of the sleeve 150 is a pulley 154 belted to the shaft 104. With the pulley co-operates a clutch member 156 fast upon the sleeve 150 and being movable into and out of engagement with the pulley by a handle 158 acting upon the spindle 152. When the clutch is in engagement with the pulley, the disk 146 is rotated from the sleeve through the gearing 148. This rotation is communicated to the reel-shaft through a friction-washer 160 interposed between it and the disk 144. The two disks and this washer are held in driving engagement with a capability for slipping without the imposition of undue strain upon the strip P, by springs 162 arranged in recesses in the cover of the casing 141 which surrounds the driving elements. The inner ends of these springs bear against an anti-friction plate 166 between them and the outer face of the disk 146; and screws 168 threaded through the outer side of the casing-cover and co-operating respectively with the springs permit the pressure and consequent driving engagement to be varied.

To cause the reciprocation of the reel-spindle 140, it is arranged for longitudinal movement in its bearings and through the disk 144, and has fixed upon it spaced collars 170, 170. These receive between them the depending portion of a nut 172 engaging the thread upon a screw 174 mounted to turn in the upper portion of the casing. Loosely carried upon an unthreaded extension of the screw are sleeves 176 and 178, rotated in opposite directions from a gear 179 on the hub of the disk 144 by spur-gearing 180 and 182, the latter through a counter-shaft 184. The sleeves 176 and 178 carry opposed clutch members, which may be engaged by opposite clutch-faces of a member 185 splined upon the screw 174 between the sleeves. This member 185 is grooved to receive the end of a shifting lever 186 fulcrumed upon the casing 141. Movable horizontally in the casing is a rod 192 having threaded portions carrying contact members consisting of pairs of nuts and lock-nuts 188 and 190, respectively. These contact members are situated upon opposite sides of the depending portion of the nut 172, the rod 192 being shown as passing through an opening therein. As the screw 174 rotates under the influence of the engagement of the clutch member 185 with one of the sleeves 176 or 178, it produces, through the contact of the nut 172 with one or the other of the collars 170, axial movement of the spindle of the reel 138 in one direction. This continues until the nut strikes one of the contact members 188 or 190, which causes the rod 192 to be moved lengthwise, and act upon the lever 186 to shift the clutch member 185 until it comes into engagement with the other sleeve, reversing the rotation of the screw 174, and therefore producing travel of the reel in the opposite direction, thus laying the strip symmetrically upon its periphery from side to side. To maintain the clutch member 185 in its temporary engagement with a particular clutch-sleeve, a spring-pressed detent 194 is mounted upon the casing 141, this being engaged in the two positions of the member by the opposite inclined sides of a projection 196 from the side of the lever.

By this winding mechanism it will be seen that a constant yieldable tension is applied to the strip by the rotation of its spindle 140 under the influence of the friction driving mechanism, and that at the same time the longitudinal movement of the spindle produced by the screw and clutch mechanism disposes the strip uniformly about the reel between its heads.

Staple-feeding mechanism.

Presentation of successive portions of the strip for the operations upon it having been described, the feeding of the staples and buttons for their assemblig and mounting upon the strip will be considered, the staple-feeder F being taken up first. This mechanism is best disclosed in Figs. 2, 4 and 6 to 10, inclusive. Supported at one side of the frame-section 101 is a staple-feeder-casing 200, at the top of which is carried a staple-receptacle or hopper 202. The receptacle is cylindrical, having a downwardly and inwardly inclined bottom 204, terminating at an annular space 205 between it and the lower portion of an inner bell-shaped wall 206. This wall is carried by a cylindrical, upward extension 208, fixed in the central opening of the hub of a spider 210 secured upon the top of the hopper 202, the end of this extension being threaded to receive a nut 212, which carries the weight of the wall 206 upon the spider. The top of the hopper 202 is closed by a cover 214 having an axial opening, and which may be centered by an inverted cup 216 formed as a depending skirt from the nut 212. To limit the flow of the staples to the opening 205, preventing them from gathering in too great masses at the points from which they are to be elevated, a cylindrical wall 218 has a central hub surrounding the extension 208, it being supported upon a screw 220 turning in the hub of the spider and being threaded into the hub of the wall. By rotating the screw 220, the wall 218 may be raised and lowered, so that the space between its lower edge and the bottom of the hopper may be varied to control the flow of staples therethrough. The screw may be fixed in its adjusted position by a collar 222 surrounding the extension 208 and having a slot in its side to engage and hold the squared head of the screw. This retaining collar is shown as held in place by the nut 212.

Figure 3:
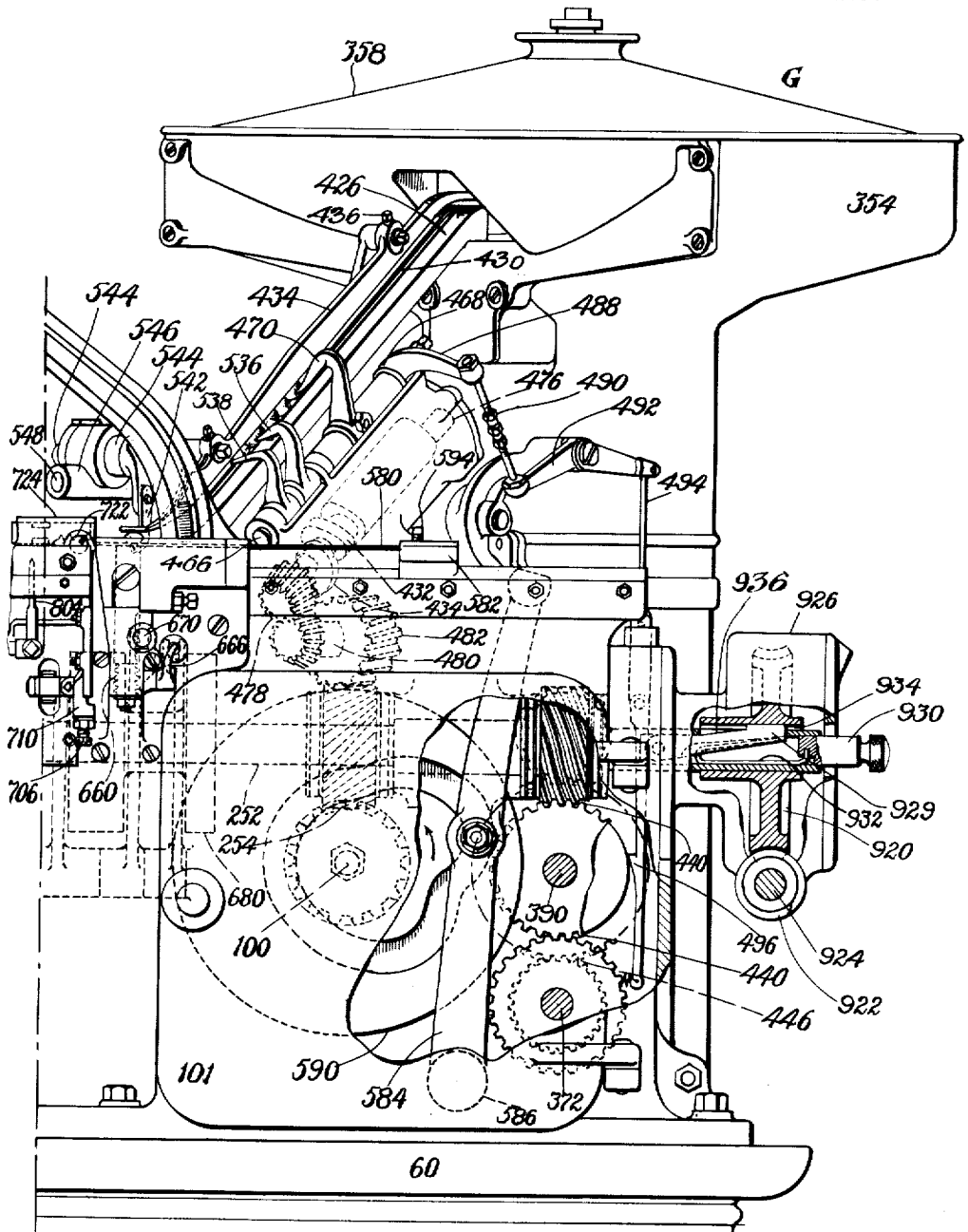

Movable vertically through the annular space 205 in the bottom of the hopper are a central, cylindrical elevating or feeding wall 224 and concentric, inner and outer elevating and positioning walls 226, 226 contacting with the central wall and being guided by a cylindrical portion 228 of the casing 200, which supports the hopper upon the casing 101. The central wall 224 is fixed upon a disk 230, fast upon a spindle 232 guided in the casing 101 and in an axial bore in the extension 208. The spindle is yieldably mounted at its lower extremity upon a slide 234 movable in vertical ways in the casing 101, there being a helical spring 236 surrounding a sleeve 238 threaded upon the spindle at 240 and locked in place by a nut 242, the lower portion of the spring occupying a recess in the slide. Beneath the recess, threaded upon the spindle, is a nut and lock-nut 244 contacting with the bottom of the slide. Entering a depression in the inner face of the slide is the pin of a crank-disk 246 fixed upon the forward extremity of a horizontal shaft 248 rotatable in the casing 101 and constantly driven by spiral-gearing 250 from an actuating shaft 252 journaled across the casing. This actuating shaft receives its motion through spiral-gearing 254 from the power-shaft 100 (Fig. 3). As the crank-disk 246 is rotated, it raises and lowers the slide, and through the spring 236 carries up the spindle 232 until the nut 242 contacts with a surface 256 upon the casing 101. The spring 236 then yields to give a period of lost-motion, during which the central elevating cylinder rests for a time with its upper edge in alinement with the upper extremity of a staple-race-way 258 (Figs. 2, 4, 6 and 23). This race-way is in the form of a bar, which the staples delivered by the elevating cylinder straddle, and the lower end of which is vertically alined with a staple-supporting and guiding groove 260 extending along a table 262, in which is the race-way-section 132. Above the race-way 258 is carried upon the frame a parallel cover-strip 259, acting to prevent the displacement of the staples. The inner and outer elevating cylinders 226, 226 are secured by a screw 264 (Fig. 7), passing through a slot in the cylinder 224 and also into a slot in the casing-portion 228, to a disk 266 loose upon the spindle 232. This disk rests at its under side upon carrier-pins 268 moving freely through openings in the disk 230 and bearing at their lower extremities upon the upper end of a sleeve 270 surrounding the spindle and turning within the casing 101. A helical spring 272, situated about the spindle, contacts at its upper end with a collar 274 secured to the spindle, and bears at its lower extremity upon the disk 266, this spring tending to keep said disk seated upon its supporting pins. The sleeve 270 has formed upon its interior a helix, engaging a corresponding helix 276 upon the spindle. Upon the outside of the sleeve are elongated gear-teeth 278, with which meshes a segment 280 upon the end of a lever 282 fulcrumed upon the casing. Arranged to turn about the fulcrum of this lever is an arm 286 having a pin 288 projecting into a groove in a cam-disk 290. This pin also passes through an arcuate slot 292 (Fig. 4) in the adjacent end of the lever 282, and may be fixed in place therein by a nut 294 threaded upon the upper extremity of the pin and bearing against the top of the lever. Screws 296, 296 are threaded through the opposite sides of the lever, with their points entering the slot 292 and bearing against the pin 288. By these screws the angular position of the lever 282 may be changed, and the adjustment fixed by the nut 294. This, by turning the sleeve 270, varies its height upon the helix 276, and consequently the initial location of the upper edges of the cylinders 226, 226 with reference to the space 205. The disk 290 is secured for rotation to a vertical shaft 298 journaled in the casing 101 and driven by bevel-gearing 300 from the shaft 248. As has already been pointed out, the crank-disk 246 raises the central elevating cylinder from its lowest point, determined by the location of the nuts 244 on the spindle and at which it is beneath the mass of staples over the space 205 in the hopper, to the highest point of its travel, when the nut 242 contacts with the casing-surface 256. The extent of this upward travel may be adjusted by changing the position of the sleeve 238 and nut 242. When the pin 288 is in the circular portion of the groove of the cam 290 (Fig. 32), the gearing 278, 280 has no effect upon the sleeve 270, so that the helices of the sleeve and spindle engage one another to cause the inner and outer elevating cylinders to rise with the central cylinder. At the beginning of the upward movement of the cylinder 224, however, the pin enters one of the outwardly curved portions of the cam-groove, which so rotates the sleeve 270 that it causes it to be held back upon the helix, retaining the pins 268 and disk 266 lowered under the influence of the spring 272 and allowing the cylinders 226, 226 to remain for a time in their initial position. This brings the upper edge of the cylinder 224 from the position illustrated in Fig. 6 of the drawings to the lower position appearing in Fig. 7, in which a circumferential group of the staples has been raised by the moving cylinder above the mass in the hopper. Now the oppositely inclined portion of the cam-groove turns the sleeve 270 in the other direction, raising the pins 268 and the disk 266 until the cylinders 226, 226 overtake the central cylinder. These elements are now related as is shown in Fig. 8, causing the staples to be centralized by the contact of the cylinders 226 with the inner sides of the legs, so that the depressions in their yokes engage the edge of the intermediate cylinder and hang symmetrically thereon. Another relative movement of separation and alinement is imparted to the cylinders by the succeeding portion of the cam-groove, this bringing them into the relation appearing in Fig. 9, and then to that illustrated in Fig. 10. Thereafter the circular portion of the groove comes into action, and during the remainder of the upward travel the cylinders move together until they have returned to their lowered position. It should be observed that the cam 290 is so designed that when the cylinders are in their staple-receiving position, the upper edges occupy substantially the same horizontal plane (Fig. 6) to permit the staples to readily pass over them, to be taken up by the central cylinder; but that when they are in their final delivery position, as appears at the upper portion of Fig. 7, the central cylinder is slightly elevated above its companions to hold the staples in their true central relation and in correct alinement with the race-way 258.

When the elevating cylinders with the staples which they carry are in the highest position, in co-operation with the race-way 258, said staples are in the plane of movement of delivering or feeding members, here shown as consisting of a circular series of brushes 302. The fibers of these brushes are arranged upon vertical stems 304 depending from the edge of a disk 306 carried upon a sleeve 308 resting upon the inner hopper-wall 206 and having a bearing about its cylindrical portion 208 below the hub of the wall 218. These brush-stems are threaded for vertical adjustment through their disk, being held against rotation by lock-nuts 310. The brushes are revolved continuously by spur-gearing 312 connecting the sleeve 308 and a vertical shaft 314 (Fig. 2) journaled in the casing 200, which shaft is driven by spiral-gearing 316 from an inclined shaft 318 rotatable in the casing-section 101, this shaft 318 being in turn driven by spiral-gearing 320 from the actuating shaft 252. When the elevating cylinders are in the final or delivery position, as appears at the upper portion of Fig. 7, the brushes 302 act to sweep the staples from them and complete the operation of supplying the race-way 258, down which said staples slide by gravity. If the race-way becomes completely filled with staples, because the rate of supply exceeds that of utilization, the brush-fibers simply yield, without exerting undue pressure upon the accumulated staples. Depending from disk 306 is a skirt 322, extending into proximity to the space 205 and therefore to the staples lying thereover. The skirt has agitating projections 324, which pass through the staples and distribute them about the tops of the cylinders, preventing them from so massing that they bridge over the space and thus fail to settle upon the cylinder 224 for elevating engagement by it.

*Button-feeding mechanism.*

Considering now the the supply of buttons by the mechanism G to the assembling and mounting mechanisms, and referring particularly to Figs. 11 to 21, inclusive, there is situated upon the casing-section 101, at the opposite side from the staple-feeding mechanism F, a casing 350, having a cylindrical portion 352, at the top of which is carried a button-hopper 354. The supporting spider 356, the cover 358, the controlling wall 360 and the adjusting means for the latter may be substantially as are the corresponding elements of the staple-hopper, and will not particularly be described. Extending vertically and axially of the hopper 354 is a spindle 362, bearing in the casing 101 and in the spider 356, and resting upon an independent alined spindle-section 364, the two spindle-sections being divided at 366. The lower section 364 is fixed upon a slide 368 by means of a set-screw 369, so that it may be vertically adjusted. The slide is movable in vertical ways in the casing 101, being carried upon the pin of a crank-disk 370 constantly rotated by a horizontal shaft 372 journaled in said casing. The manner in which this and other actuating elements of the button-feeder are moved will later be described. Threaded at 374 upon the spindle-section 362 for vertical adjustment, and being secured by a lock-nut 376, is the depending hub 378 of a cylindrical head-engaging and button-elevating member 380 arranged to slide within the cylindrical portion 352 of the casing. The top of this member 380 is grooved at 382 (Fig. 20), the upper edge being curved downwardly and inwardly and giving a depression into which the button-heads tend to settle from the bottom of the hopper, and there be carried with their eyes inclined upwardly and inwardly.

Surrounding the adjacent portions of the spindle-sections 364 and 362 is a sleeve 384, held by a set-screw 386 to permit vertical adjustment in a slide 387 vertically movable in ways in the casing 101. The slide 387 is reciprocated in its ways by engagement with it of the pin of a crank-disk 388 secured upon a shaft 390 journaled parallel to the shaft 372 of the associated crank-disk 370. The upper end of the sleeve contacts with a collar or enlargement 392 upon the spindle, and thus in the rotation of the crank-disk 388 acts upon the cylinder 380. A spring 394 connects the slide 387 and the supporting head of the cylinder 380, this spring tending to maintain engagement between the sleeve 384 and the enlargement 392 and steadying the cylinder in its movement. The throw of the crank-disk 388 is greater than that of the disk 370, so that when the former is in operation, it will carry the upper spindle-section 362 away from the lower section 364, elevating the cylinder 380 independently of the action of the disk 370, the spindle-sections separating at this time at 366. Arranged to slide vertically between the cylinder 380 and a stationary bell 396, the latter being carried upon a sleeve 398 fixed to the spider 356 and surrounding the upper end of the spindle-section 362, is an eye-engaging and button-positioning cylinder 400. The cylinder 400 is concentric to the cylinder 380 and with the groove 382 therein forms an annular button-receiving depression. It has an elongated hub 402 surrounding the spindle 362, there being at the upper portion an enlargement 404 resting upon the bottom wall or head of the bell 396, which thus limits downward movement of the cylinder 400. Between the upper portion of the bell and the bottom of the hub 402, encircling the spindle within said hub, is a helical spring 408, which assists gravity in holding the cylinder 400 in its normally lowered position, and steadies the movement of this cylinder when it is raised. Fastened about the spindle-section 362 below the end of the hub 402 and between it and the bottom of the hub 378 is a collar 410, which, after a certain upward travel of the spindle, will contact with the lower extremity of the hub 402 to elevate the cylinder 400.

Rotatable about the bottom of the sleeve 398 and being held against downward movement by the top of the bell 396 is a rotatable delivering disk 412, having secured to it a horizontally extending annulus 414, which may consist of a flat ring of rubber. The periphery of this annulus lies above and just within the interior surface of the positioning cylinder 400. Through its supporting disk, it is rotated by spur-gearing 416 from a vertical shaft 418 having a bearing in the bell and in the bottom of the portion 352 of the casing. The shaft 418 is connected by bevel-gearing 420 with a horizontal shaft 422 arranged to turn in the casing 101, and driven from the shaft 372 by gearing which will later be described. As is best shown in Fig. 19 of the drawings, when the cylinders 380, 400 are in their highest positions, the rotation of the annulus 414 acts to deliver the buttons supported upon the cylinders into the curved end of a downwardly inclined race-way 426, which enters an opening 428 in the upper edges of the cylinders. The members 380, 400 and 414 therefore cooperate to supply buttons from the receptacle to the race-way. The lower extremity of the race-way 426 delivers to the staple-table 262 at the outer end of the horizontal race-way section 130 (Fig. 23). In cross-section, the race-way 426 shows a slot 430 receiving the button-eyes, at each side of which slot are curved grooves 432, 432, upon which the under sides of the button-bodies rest. Supported above the race-way is shown a cover 434, holding the buttons against outward displacement, this preferably being carried upon screws 436, by which it may be vertically adjusted to permit of correct cooperation with buttons of different sizes.

The actuating mechanism for the elevating and positioning cylinders 380 and 400 and the annulus 414 will now be described. This mechanism turns the crank-disk 370 continuously, and, under the control of the buttons in the race-way 426, rotates the crank-disk 388 in two steps of 180 degrees each, and the annulus 414 through preferably a full button-feeding rotation for the first half-rotation of the disk 388. The means for accomplishing this appears most clearly in Figs. 11 to 17, inclusive. A train 440 of spiral-gearing drives the shaft 372 at the proper speed from the shaft 252, and at the same time rotates a clutch member 442, turning loosely upon the shaft 390. Associated with this clutch member 442 and also loose upon the shaft 390 is a clutch member 444, rotated through spur-gearing 446 from the shaft 372. Each of the members 442 and 444 has a circular series of internal depressions 448. Between them are respectively co-operating clutch members 450 and 452, the former fixed to the shaft 390 and the latter loose thereon and connected by spur-gearing 454 to the shaft 422. Mounted to turn in the members 450 and 452 are the respective connecting members 456 and 458 (Figs. 16 and 17), each having a detent-portion 460, which is urged by a spring 462 to leave, by its partial rotation, a recess which it occupies to engage one of the depressions 448 and cause the associated clutch members to rotate togther. Each detent-portion is normally held out of this driving engagement by contact of a projection 464 of its connecting member with a relatively fixed controlling member, so that the corresponding clutch member 452 or 450 will be at rest.

Mounted in the frame, parallel to the race-way 426, is a spindle 466 (Figs. 18 and 21), about which is arranged to turn a sleeve 468, having fixed upon it a contact-finger 470. This finger, under the influence of a spring 472, is drawn at its end over the race-way into contact with a button therein, or, if the race-way is empty at the point beneath the finger, is carried downward to a greater extent into contact with the race-way itself. The finger 470 may be adjusted longitudinally of the sleeve 468 and clamped by means of a set-screw 474 to adapt it for co-operation with buttons at different points along the race-way, providing for the gathering below it of a greater or less number. Rotatable in brackets rising from the casing 101 and parallel to the spindle 466 is a shaft 476, connected by bevel-gearing 478 with a horizontal shaft 480 rotated by spiral-gearing 482 from the shaft 252. Fixed upon the shaft 476 is a cam 484, contacting with a roll 486 upon an arm projecting from the finger 470 at the opposite side of its carrier-s'eeve 468. The sleeve 468 also has fast upon it, near its upper extremity, an arm 488, which is joined by a link 490, preferably adjustable in length and having universal joints, to one arm of a bell-crank lever 492 (Fig. 11) pivoted upon the frame. Joined to the opposite arm of the bell-crank lever is a link 494, having at its lower extremity a hooked engaging member 496 (Fig. 13). When there is a button beneath the finger 470, the connecting elements maintain the hook of the member 496 above the lower end of a stop member 498, which is supported upon a vertical spindle 500 mounted to slide in the frame, and forced normally down by a spring 502 surrounding the spindle. A spring 504, connecting the end of the hooked member and frame, holds the former against the side of the stop member. If the number of buttons in the race-way 426 so diminishes that the uppermost is at a point farther down the race-way than the finger 470, this finger is drawn down by its spring 472, lowering the hooked member 496, so that it passes beneath the end of the stop member 498. Previous to this, the roll 486 was held, by the contact of the finger 470 with a button, out of engagement with the cam 484, except at its portion of maximum diameter, which in its rotation acts sufficiently upon this finger to raise it and allow the downward travel of the buttons along the race-way. Now, however, the roll 486 is fully raised into contact with the periphery of the cam, and this in its rotation, moves the connections of the hooked member 496 in the opposite direction to that in which they were carried by the action of the spring 472. Consequently, the hooked member is lifted, carrying with it the stop member 498 and compressing the spring 502. This rise of the member 498 releases the projections 464 of the connecting member hooked member is lifted, carrying with it the side of the stop member, and said connecting member is rotated by its spring 462 until the engaging portion 460 turns into one of the depressions 448 of the constantly rotating clutch member 442. This drives the clutch member 450, by which the connecting member 456 is carried until the projection 464 strikes the side of an upwardly spring-pressed stop member 508 mounted similarly to the stop member 498. The contact turns the connecting member 456 against the tension of its spring, restoring the engaging portion 460 to its normal position out of the depression 448 and releasing the driven clutch member 450 from the driving member 442, the former thus being stopped after it has rotated through 180 degrees. As soon as the clutch member 450 started in rotation, a cam-projection 506 upon its periphery came into contact with the hooked member 496, releasing it from engagement with the end of the stop member 498 and allowing the spring 502 to return said stop member to its lowered position, the hook of the member 496 again resting against the outer side of the stop member, ready for a succeeding action. As the stopping position of the clutch member 450 is approached, a projection 510 upon it, having turned through nearly a half revolution, comes beneath the under side of a lever 512 pivoted upon the frame and having its opposite end articulated to a spring-pressed stop member 516 arranged similarly to the companion stop members 498 and 508. After the projection 510 has passed beneath and forced up the lever 512, an inclined surface 518 upon it lies beyond, considering the direction of rotation, a surface 520 upon the lever 512, so that reverse movement or rebound of the clutch member 450 is prevented. By this half-rotation of the clutch member 450, the crank-disk 388 has been turned through 180 degrees and stopped. The effect of this will hereinafter be described. When the lever 512 was raised by the projection 510, it lifted the stop member 516 away from the projection 464 of the connecting member 458 mounted in the clutch member 452. The connecting member is thereupon turned by its spring 462, and, similarly to the associated connecting member 456, joins its clutch member 452 to the driving member 444. Rotation of this member 452 results, continuing until it has made a complete turn and the projection 464 again strikes the stop member 516, throwing the connecting member out of engagement and releasing the clutch member 452. Just before the clutch member 452 is stopped by the member 516, a projection 522 on said clutch member contacts with the upper surface of a lever 524, fulcrumed upon the frame and engaging at its opposite end the stop member 508. There are upon this projection and lever respective contact-surfaces 518 and 520 to prevent the rebound of the clutch member 452 similarly to that of the member 450. The clutch member 452 having thus been stopped and held, it has, through the intermediate gearing 454, 420, 416 (Fig. 11), turned the annulus 414 through a complete rotation. The downward movement of the stop member 508, under the influence of the lever 524, releases the projection of the connecting member 456, which caused the holding of the clutch member 450 at the end of its half-rotation. The connecting member 456 is consequently again turned by its spring, so that the rotation of the member 450 is effected by the driving member 442 until the projection 464 of the member 456 returns to its initial position, at which it contacts with the stop member 498. This causes the release of the clutch member 450, which has now completed a full turn, bringing the crank-disk 388 to its initial position. The levers 512 and 524 are cut out at 528 and 530 to respectively permit the passage of the projections 522 and 510 without effect upon such levers, which, as has been explained, are moved respectively by the projections 510 and 522.

The effect of the actuating mechanism described above upon the button-elevating and positioning cylinders 380 and 400 and upon the annulus 414 is as follows: The cylinder 380 is constantly reciprocated by the crank-disk 370, the spindle-sections 362 and 364 being in contact at 366. This causes the heads of the buttons in the hopper 354 to settle into the groove 382 with their eyes resting against the positioning cylinder 400, as may clearly be seen at the lower portion of Fig. 20 and also in Fig. 11. As long as there are buttons in the lower portion of the race-way 426 as far above the delivery-end as the finger 470, so that the latter is held out of contact with the cam 484, the crank-disk 388 remains at rest and the cylinder 400 out of operation. When, however, the buttons have been used from the race-way until the upper one therein passes below the finger, the release of this produces the half-rotation of the crank-disk 388, which has just been described. The movement of the slide 387, under the influence of the crank-disk 388, causes the contact of the end of the sleeve 384 with the enlargement 392 upon the spindle to raise the elevating cylinder 380 to a greater extent than has been effected by the crank-disk 370 of shorter throw, the spindle-sections now separating at 366. The cylinders are consequently related as appears at the center of Fig. 20. At this time the eyes of the buttons lie in a substantially horizontal plane above the upper end of the positioning cylinder 400. Now the collar 410 upon the spindle strikes the lower extremity of the hub 402 of the positioning cylinder, and the cylinders move up together as shown at the upper portion of Fig. 20. In this relation the button-eyes have been caught between the inner surface of the cylinder 400 and the outer edge of the annulus 414 and brought to a vertical position. As the cylinders rest, the rotation of the annulus is started under the influence of the clutch member 452, and by the frictional engagement of the yieldable material the buttons are dragged about the cylinder 400 and into the slot 430 of the race-way 426, down which they slide into contact with the buttons which remain therein. It should be noted that the elevating capacity of the cylinder 380, for a single operation, preferably does not exceed the holding capacity of the raceway above the finger 470. There is now a button-body beneath the finger 470, so that when it is released by the cam 484 it is over a button in the race-way, upon which it descends to maintain the member 496 out of lifting engagement with the stop member 498 until the buttons have again lowered in the race-way to a point beyond it. The button-receiving reciprocation of the cylinder 380 is now resumed, and the action of the positioning cylinder and feeding annulus ceases until the supply of buttons in the race-way has passed below the finger 470. By this intermittent delivery, crowding and clogging of buttons in the race-way is entirely avoided, it being evident that difficulties would result were the forcing of the buttons into the slot 430 to constantly continue under the influence of frictional engagement of the annulus 414.

In addition to the cam 484, the shaft 476 carries cams 532 and 534, acting respectively upon upper and lower retaining fingers 536 and 538 co-operating with the buttons in the race-way 426 below the finger 470. The finger 536 turns with the spindle 466, and the finger 538 about said spindle. Springs 540, 540 cause the finger 536 to move, when permitted by its cam, into contact with a button-body, while the finger 538 is carried, when freed by the cam, just in front of the next button below that engaged by the finger 536. The action of the cams 532 and 534 is to alternately raise the fingers and permit them to be lowered, the cam 534 being preferably of the quick-drop type, and the relation between the movements being such that as the lowest button is released by the finger 538, the button above is held by the finger 536, and that thereafter, when the lower finger is down, the upper finger frees its button to take the place of the one just released by the finger 538. The button which leaves the finger 538 slides down the race-way into the path of an oscillatory delivery finger 542 (Figs. 18 and 21) having a hooked end operating in the slot 430, which serves by its forward movement to positively advance the buttons one by one to the assembling mechanism. The finger 542 is secured upon a short shaft 544 journaled in a bracket 546 mounted on the casing 101. This bracket also guides a reciprocatory horizontal rod 548, having formed upon its rack-teeth 550, which mesh with teeth of a gear-segment 552 fast upon the shaft 544. At the opposite end of the rod 548 rack-teeth 554 are formed, engaged by a gear-segment 556 secured upon a horizontal shaft 558. The shaft 558 also carries, fixed upon it, a segment 560, engaged by a rack-bar 562 sliding in vertical ways in the frame and having a roll or projection 564 entering a groove in a cam 566 fast upon the shaft 480. As may best be seen in Fig. 5, the rod 548 includes relatively movable sections, one 568 being tubular and containing a spring 570 co-operating with the companion section and permitting the rod to yield in event of improper engagement of the finger 542 with the buttons. The section 568 may also be adjustable as to length, having a portion 572 threaded upon a stem 574 projecting from the adjacent section, and fixed in the desired position by a lock-nut 576. By means of this adjustment, the relation of the finger 542 to the button which it is to deliver may be varied.

*Assembling and mounting mechanisms.*

The staples are advanced along the table 262, upon which they are deposited by their race-way 258, by a reciprocatory bar 580 (Figs. 3, 5 and 23), which serves not only as a feeding member, but is a direct agent in the assembling and mounting of the fasteners. This bar is carried upon a slide 582, movable in horizontal ways upon the casing 101, and is engaged by the upper extremity of a lever 584 pivoted in the casing and oscillated by a cam 590 secured upon the shaft 100. The timing of this cam and its effect in reciprocating the bar will be discussed later. The bar 580 fits within the slot 260 in the table 262, and has its forward end 592 presenting such a contour as to generally conform to the curvature of the staple-yokes which it is to engage. It is preferably fixed in place upon the slide by a set-screw 594, which allows the normal position of the forward end of the bar to be altered. The thickness of the bar 580 is substantially that of a staple, and the distance between the end of the race-way and the bottom of the slot 260 is somewhat greater than the thickness of a staple. Consequently, the bar may, in its reciprocation, pass beneath the race-way, advancing the lowermost staple through the slot, and holding upon its upper surface the succeeding staples, to prevent them from traveling down the race-way. Then, upon the rearward movement of the bar, these staples are freed, so that the lowest assumes a position in front of the end 592 of the bar, ready to be fed in its next forward movement.

Situated at the juncture of the staple-slot 260, the button race-way 426 and the assembling race-way section 130 is the assembling mechanism H (Figs. 23 to 28). Extending into the path of the button-eyes, at the end of the race-way slot 430, is the upper extremity of a vertical spindle 600, having a bearing in surrounding sleeve-sections 602 and 604 mounted to turn in the frame. The section 602 surrounds somewhat less than half the spindle for a portion of its length, while beyond this, at 606, the sleeve 602 completely encircles the spindle. This sleeve 602 has an annular flange 608, bearing against a wall of the frame to prevent downward movement of the sleeve. The section 604 is similar in form to the upper portion of the section 602, being less than semi-cylindrical, but in this case for its entire length. At its upper end at 609, it overhangs a cut-away portion of the companion section, there being between them a space at 610. The arrangement allows the section 604 to rotate relatively to the section 602, so that the opposite walls of the space 610 may approach one another and serve as jaws to grasp a button-eye. A collar or flange 612 at the lower end of the section 604 holds it against downward movement, similarly to the collar of the companion section. Rotation imparted to the section 604 is against the resistance of a friction-plug 614, movable toward and from the sleeve in an opening in the frame and being pressed into contact with said sleeve by a spring 616. This spring at its outer extremity contacts with a screw 618, closing the frame-opening and permitting, by variations in its position, a change in the tension of the spring and the friction imposed upon the sleeve-section by the plug.

The space 610 may be moved from initial button-receiving alinement with the slot 430, as is illustrated in Fig. 27, into button-delivering alinement with the slot of the race-way 130, as appears in Fig. 28, by a gear-segment 620 formed upon the portion 606 of the sleeve-section 602 and engaged by rack-teeth 622 upon a bar 624. The bar 624 has a reduced portion, surrounding which is a slide 626, (Fig. 24), there being upon opposite sides of the slide, abutting at their outer ends against collars fixed to the rod, helical springs 628, 628. Engaging the slide 626 is a lever 630, fulcrumed upon a spindle 632 fixed in the base 101 and having a projection 634 co-operating with a cam-groove 636 formed in a disk 638 fast upon the shaft 252. To insure correct alinement of the space 610 with the raceway-slots, the flange 608 has a segmental projection 640 operating between stop-surfaces 642, 642 upon a collar 644, which is mounted to turn upon the frame and which furnishes a bearing for the flanges of the sleeve-sections. The angular distance between the faces 642, 642 is equal to the angular relation of the race-way-slot 430 and the axis of the staple-groove 260, which is in alinement with the slot of the race-way-section 130. The collar 644 may be adjusted circumferentially by screws 646, 646 passing through openings in the frame and carrying nuts 648, 648, by which it may be turned and fixed in position. Consequently, at the opposite extremes of movement, when the sides of the projection 640 are in contact with the surfaces 642, the jaw-space 610 may be caused to exactly aline with either the slot 430 or the slot of the race-way-section 130. The presence of the springs 628 in the connections for rotating the sleeve-sections permits lost-motion, the sleeve-sections being turned to the stopping position against the surfaces 642 before the travel of the lever 630 in either direction ceases.

The spindle 600 is normally raised, so that a groove 650 in one side of its upper extremity lies opposite the slot 430 in the button-race-way. This groove extends downwardly within the sleeve-section 602, being engaged thereby to cause the spindle to be turned with the sleeve. In its elevated positon, the spindle is yieldably held by a spring 652 interposed between a collar or flange 654 upon the spindle and a plug 656, which is threaded into a counter-bore in the sleeve-portion 606. Arranged upon an enlargement at the lower end of the spindle 600 is a circular rack 660, with which meshes a gear-segment 662 carried by a shaft 664 journaled in the frame. Attached to the outer extremity of this shaft is an arm 666 having contacting with it the head of a screw 668, threaded into the end of a rod 672 sliding horizontally in the frame and secured in place by a lock-nut 670. Between collars 674, 674 fast upon this rod projects the end of a lever 676 turning about the spindle 632. The lever 676 has a lateral projection 678 engaging a groove in a cam 680. The reciprocation of the rod 672 by this cam and lever alternately brings the head of the screw 668 against the arm 666 to lower the spindle 600 until its upper extremity is below the space 610 between the sleeve-sections, and permits the spindle to be restored to its raised position by its spring 652. By adjustment of the screw 668, the extent of lowering of the spindle by the cam may be changed.

The general action of the assembling mechanism H may be outlined as follows: In its initial position, the space 610 between the sleeve-sections is alined with the button-race-way slot 430, and into this space the lowermost button in the raceway released by the finger 538 is thrust by the delivery finger 542. This latter finger having supplied the button is withdrawn, the bar 580 advances, bringing a staple with it and thrusting one leg through the button-eye, and the sleeve-sections are turned to fully thread the button-eye upon the staple. This is as illustrated in Fig. 27 of the drawings. A slight recession of the bar 580 now occurs to free the assembling mechanism. After retreat of the bar, the sleeve-sections are turned until the button-eye is alined with the groove of the race-way-section 130 (Fig. 28), whereupon the spindle 600 is lowered out of the path of the eye and staple, and a further forward movement of the bar 580 carries the assembled button and staple to the mounting mechanism. After this the spindle 600 rests, prior to starting its return to its initial position, and the sleeve-sections and spindle are reversely rotated to bring the space 610 and groove 650 opposite the race-way-slot 430. There is also an additional advance movement of the bar 580 before its withdrawal to the initial position, this being for a purpose which is hereinafter fully explained.

Turning now to the holder-strip P, as it runs from the advancing mechanism D upwardly to and over the mounting table 132 of the mechanism I (Figs. 23, 24, 25, 29 and 30). it passes along the side and over the rounded upper end of a forming and retaining bar 700, which lies in close proximity to the end of the table 132. The width of the upper extremity of this bar is preferably as great as that of the strip to fully support it, and its thickness and curvature correspond to the corrugations z which it is designed to enter. It has across the curved end grooves 702, 702, spaced from one another to an extent equal to the distance between the legs of the staples which are to be mounted, and being of sufficient width to receive said staple-legs. This spacing is, of course, also equal to the distance between the openings y, y in the mounting-strip. The bar 700 is fixed in a carrier member 704, being adjustable vertically therein in suitable ways by means of a screw 706 threaded through the lower portion of the carrier in alinement with the bar. When the adjustment has been effected to give the proper vertical relation between the rounded end of the bar and the strip-corrugations, it may be fixed by screws 708 passing through the side of the carrier and engaging the bar. The carrier member is secured to or formed integrally with a slide 710 mounted to reciprocate upon vertical ways in the frame, this slide having pivoted upon it a block 712 engaged by the forked end of a lever 714 arranged to turn upon the frame and having a projection 716 engaging a cam-groove 718 in the disk 638. While the mounting-strip P is at rest, having been brought by the advancing mechanism into a position with one of its corrugations just at the edge of the table 132, the bar 700 is raised by its actuating mechanism until its rounded end fits within the corrugation, the grooves 702 registering with the strip-openings y. Here the bar remains during the mounting operation, when, by the advance of the bar 580 from the assembling mechanism, the legs of a staple on which is threaded the eye of a button, are forced through the openings y. This having been completed, the bar 700 is lowered by its actuating mechanism to permit the feed of the strip to bring the next fastener-receiving area into the mounting position.

Co-operating with the bar 700 to form and retain the strip, during the mounting of the fasteners and also during the advance of the strip along the table 132, is a finger 720, which is bodily movable back and forth over the table, is adapted to be longitudinally reciprocated in the direction of its axis, and is also arranged to be oscillated about an axis outside itself. The bodily movement of the finger over the table facilitates the forward feed of the strip, and holds it against displacement while other positioning and clamping means are out of action. It also, by co-operating with the forward end of the bar 580 to grasp the strip and by forcing the latter against the table during this advance, relieves said strip of the tension applied to it by the winding mechanism E between this point of engagement and the advancing mechanism D, thus preventing the pull exerted by the winding reel from flattening out the corrugations prior to the application of the staples to them. The longitudinal movement of the finger carries it clear of the strip, so that it may be returned to the new engaging position out of contact with the strip; while the oscillation, taking place in an anti-clockwise direction, as viewed in Fig. 23 of the drawings, and co-operating with a secondary bodily forward movement, separates grooves 721, 721 in the side of the finger from the applied staple in preparation for the outward axial movement of the finger. The finger 720 is shown as generally cylindrical in form, and its grooves 721 in the strip-engaging position of the cylinder, register with the bar-grooves 702, 702 to receive the staple-legs and permit them to enter the strip-openings y. Its outer end is tapered to avoid interference with the edge of the strip during its travel axially over it, and it is mounted eccentrically upon the end of a spindle 722 carried in bearings upon one end of a secondary slide 724 movable transversely of the machine upon ways on the upper surface of a primary slide 726, which is arranged to reciprocate in ways upon the frame in the same direction as does the secondary slide.

The bodily movement of the finger is in steps of different lengths. The longer is equal to the distance of the strip feed between successive fastener positions, and is effected by the travel of the slide 582 of the assembling bar. Projecting from the forward end of this slide 582 is a rod 728, the end of which may contact with a hardened stud 730 (Fig. 25) fixed upon the adjacent side of the primary slide 726. This slide 726 is held in its normal position by a spring 732 situated in a recess in the upper side of the slide, and bearing at one end against said slide and at the other against a bracket 734 fixed upon the frame. The position at which the primary slide stops under the influence of the spring is adjustably determined by a screw 736 threaded through a depending portion of the slide and being alined with the bracket. When it has been positioned to give the proper relation to the slide at the time that the finger 720 cooperates with the bar 700, it may be fixed by a lock-nut 738. The purpose of this adjustment is to obtain the desired degree of pressure of the finger upon the paper over the bar 700. The short step of the finger 720 allows this device to advance somewhat further than the primary feeding movement, so that its slots 721 will clear the legs of the staple mounted in the corrugation with which it has been in engagement, enabling the finger to be moved out longitudinally, clear of the paper, without interfering with the staple. To bring about this secondary bodily movement of the finger, the primary slide 726 has upon its upper face a rack 740, with which meshes a gear-segment 742 secured to a shaft 744 arranged to turn upon the top of the secondary slide 724. At the end of this shaft, opposite the gear segment is secured a crank-arm 746 (Fig. 23) having a pin entering a block 748 situated within a horizontal groove in a slide 750 carried for vertical movement in ways upon the frame. In this slide 750 are horizontal ways to receive a block 752, to which is pivoted the substantially horizontal arm of a bell-crank lever 754 fulcrumed upon the frame. Upon the opposite or nearly vertical arm of this lever is a projection 756 entering a cam-groove 758 in a disk 760 fast upon the shaft 252. While the projection 756 is in the circular portion of the groove 758 (Fig. 39) and the slide 750 is therefore at rest, no effect is produced upon the secondary slide, which remains locked upon the primary slide 726 by the engagement of the rack and gear-segment, the block 748 at this time traveling idly along the groove in the slide 750. When, however, the cam-path departs from its circular relation and the slide 750 is raised or lowered, the crank-arm 746 turns the gear-segment 742 to shift the secondary slide 724 in one direction or the other upon the primary slide 726. This imparts to the finger 720, independently of the action of the slide 582, an additional forward movement to carry it away from the corrugation which it has been engaging and from the staple-legs inserted therethrough; and then, when the primary slide is at the other end of the travel, to restore the finger to its normal rearward position for its new engagement with the succeeding corrugation.

To move the finger 720 longitudinally out of the plane of the holder and return it, the spindle 722 has about a reduced portion a slide 762, from which is a downward projection entering a transverse slot in a slide 764 mounted to reciprocate, in ways upon the frame, horizontally toward and from the table 132. Into an opening in this slide 764 projects the end of a lever 766 fulcrumed upon the rod 632, and being provided with a projection 768 co-operating with a cam-groove 770 formed in a disk 772 fast upon the shaft 252. Surrounding the reduced portion of the spindle between the slide 762 and the enlarged bearing portion of the spindle is a spring 774. This yieldably transmits the movement imparted to the spindle by the slide, so that if the finger 720 becomes caught in the paper or upon a staple mounted thereon, neither the work nor the mechanism will be injured. Nuts and lock-nuts 776 threaded upon the outer end of the spindle hold in different longitudinal positions a sleeve 775, surrounding the spindle loosely and serving to vary the position of the slide 762 along it, and consequently the relation of the finger 720 to the work. This permits the finger-slots 721 to be exactly alined with the bar-slots 702.

The oscillation of the finger 720 is accomplished through the rotation of its spindle. This has formed about it elongated gear-teeth 778, engaged by a rack 780 upon a bar 782 mounted to reciprocate in a bearing upon the top of the secondary slide 724. Into a recess in the bar 782 projects one arm of a bell-crank lever 784 fulcrumed on the secondary slide. The other arm of the lever has pivoted upon it a block 786, movable along a groove in the under side of a plate 788 carried upon the top of a slide 790 arranged to reciprocate in horizontal ways upon the frame toward and from the secondary slide. Projecting into a recess at the under side of the slide 790 is the upper end of a lever 792 fulcrumed upon the frame and with a projection 794 engaging a cam-groove 796 formed in the disk 760. The plate 788 may be adjusted along the slide 790 by means of a screw 798 turning in a lug upon the slide and threaded into the plate, it being held against rotation when once positioned by a lock-nut 800. This screw 798, by varying the normal position of the lever 784 through movement of the plate 788 which engages the lever-block, determines the angular position from which the finger 720 oscillates. To fix this adjustment, the plate 788 may be secured upon its slide by screws 802, passing through slots in the plate and entering the slide.

As the strip is fed forward after the insertion of a staple in its openings $y$, the upper surface of the button-body, the eye of which is engaged by the staple-yoke, contacts with the outer end of a spring-finger 801 mounted upon an upstanding portion of the secondary slide 724. This finger bearing against the button forces its eye fully into an opening $x$ of the strip, with which it has been vertically alined as a result of its positioning by the mounting of its staple. The portion of the finger contacting with the slide is vertically slotted, and is secured in place by screws 803 extending through the slots and threaded into the slide. By loosening the screws, the finger may be carried toward and from the tops of the button-bodies and again fixed in place by setting the screws, this allowing an adjustment to obtain the proper amount of pressure for the desired eye-inserting action, and also adapting the finger to co-operate properly with buttons of different sizes.

After the advance of the strip with the finger 720, it is engaged by means which may assist in determining its correct position for the mounting operation, and which positively holds it therefor. This means is shown as including a pin 804 arranged to reciprocate into and out of the strip-locating openings $w$, and an arm 806 acting to clamp the strip upon the table 132. The field of action of these locating and clamping members is shown as in advance of the second fastener mounted upon the strip beyond the area which is being at the time operated on. The pin 804 extends in a vertical direction, and is shown as having a tapered upper end, which, as it enters an opening $w$, may, if said opening is not exactly alined with the circumference of the pin, force it slightly in one direction or another to bring the strip into precisely the correct relation over the bar 700. The lower extremity of the pin is fixed in a holder 808 divided to embrace a rod 810, upon which it is clamped in the desired vertical position, but with capability for angular adjustment, by a screw 812. The rod 810 projects through a horizontal opening in a slide 814 mounted to reciprocate upon vertical ways on the frame. From the front of the slide is a horizontally extending projection or bracket 816, divided to receive the rod and having preferably interposed between it and said rod a split eccentric bushing 818, provided with an enlargement by which it may be turned. Rotation of this bushing will cause the rod 810, and therefore the pin 804, to be moved horizontally transversely of the strip without change in the angular position of the pin. The bushing may be clamped as adjusted by a screw 820 connecting divided portions of the bracket 816.

To actuate the pin-slide 814, there is situated upon it, with stems 824, 824 arranged to slide through bushings inserted in openings in the bracket 816 and in the lower projection or bracket 822, a carrier member 826, between which and the brackets and surrounding the stems are interposed helical springs 828, 828. Movement imparted to the carrier member is yieldably transmitted through these springs to the slide, and therefore to the pin 804, the slide preferably being arrested at the opposite extremes of its upward and downward travel by adjustable stops 829, 829, any excess motion in the actuating mechanism being taken care of by the compression of the springs. Between side walls of the carrier member is pivoted a block 830, engaged by the forked end of a lever 832 arranged to oscillate upon the frame and provided with a projection 834 extending into a cam-groove 836 in the disk 772. The oscillation of this lever, under the influence of the cam, reciprocates the carrier member and therefore the pin 804 to carry the inclined end of said pin into a strip-opening $w$ when the strip is at rest and ready for the mounting of the fasteners upon it, and then draws down the pin to free the strip, so that it may be advanced for the succeeding mounting operation.

After the pin 804 has risen into an opening $w$ to position and fix the strip, the clamping arm 806 is caused to descend as a result of a connection to it from the carrier 826. The arm 806 has a curved yoke-shaped end, provided with separated pressure-surfaces 835, 835 (Figs. 29 and 30) for contact with the upper face of the strip P at opposite sides of the pin 804, while this is within an opening $w$, the end of the pin at this time lying within the upwardly curved portion of the yoke. The arm is pivoted at one side of the table 132, and has connected to it a rod 840, articulated at the other end to a projection from the front of the carrier. This rod is shown as sectional, with an interposed spring 844, which may allow the rod to yield and hold the clamping arm with spring-pressure against the strip, while the carrier member 826 is still moving upwardly. This rod 840 also includes threaded connections 846 for the purpose of varying its length, and therefore the time at which the arm 806 contacts with the strip.

Sealing mechanism.

From the mounting mechanism the travel of the strip carries it with the attached fasteners into the sealing mechanism J. From the table 132 the strip passes beneath the button-support 134, this, as in the button-raceway, having a central longitudinal slot through which the button-eyes travel, and curved grooves at each side of this slot in which the under sides of the button-bodies rest. Under this support, upon the casing 101, is mounted a tank 850 (Figs. 2, 4 and 41 to 44, inclusive), which may contain an adhesive and stiffening size, as a mixture of raw linseed-oil and commercial shellac, or the compound known as Japan oil size. The tank may be supplied from a somewhat elevated reservoir 852, carried at the rear of the casing 101 and connected to the tank by a pipe 854, the flow through which may be controlled by a valve 856. The connections between the reservoir and tank are such that a barometric feed is provided, maintaining the level of the liquid in the tank constant. The tank may be drained of its contents, when desired, through an opening normally closed by a screw-plug 857. This tank is shown as secured by screws 859, threaded into the top of the casing and passing through slots in the bottom of the tank. The movement permitted by this connection allows the operator to most advantageously adjust the tank with relation to the dwell of the paper feed, so that the application of the liquid from the tank to the strip may be heaviest at the button-eyes. Journaled in bearings projecting from the inner or rear wall of the tank are the spindles of applying rolls 858 and 860 and feed-rolls 862, 864. Carried upon the periphery of the roll 858, clamped between opposite cheeks 866, 866, are pressure and applying disks 868, 868, preferably of some yieldable material, rubber being suitable for this purpose. These disks converge outwardly from their attachment to the body of the roll, coming substantially into contact with each other along the line in which the button-eyes travel in the advance of the strip. The feed member 862 has a peripheral projection 870 arranged to project between the adjacent edges of the disks 868 and dipping at its under side into the sizing in the tank. This feed-roll brings up the sizing and deposits it both upon the peripheral portions and between the edges of the disks 868, so that they apply it both to the under surface of the strip adjacent to the button-eye and to the sides of the eye itself. In doing this, they press up the lips at each side of the openings $x$, which may have been distorted or forced out of position by the insertion of the eyes, and cause these to lie in the plane of the strip within the eye with their edges meeting therethrough, this meeting line being sealed by the applied sizing.

The applying roll 860 is preferably in the form of a brush, with its fibers projecting radially from the body and extending into contact with the under side of the strip P across its full width. The brush is supplied with sizing from the tank by the roll 864 acting in the same manner as the roll 862, but having a cylindrical surface co-operating with the brush over substantially its full width. The brush 860, acting after the applying roll 858, coats the entire under side of the strip, and also again applies sizing to the button-eyes, thus stiffening the entire mounting and completing the sealing of the eyes and staples in their openings to effectively prevent accidental displacement of the fastenings during the handling of the strip. There are shown co-operating with the peripheries of the feed-rolls 862 and 864 forked scrapers 872, 872 mounted upon spindles extending into openings in the tank-wall. The angular positions of these scrapers may be adjusted and fixed to allow a variation in the quantity of sizing which remains on the surfaces of the feed-rolls to be supplied to the applying rolls by turning the spindles in the mountings and securing them in place by screws 873 threaded through the tank-walls. Both the applying and feed-rolls may be rotated by pulleys 874 fast upon their spindles, these pulleys having operating over them a belt 876 actuated by a pulley 878 secured upon a shaft 880 journaled in the casing 101. The shaft 880 is in turn rotated by spiral-gearing 882 from the shaft 252. The brush 860 naturally wears in use, and to allow the contact of the ends of its fibers with the strip to be maintained substantially constant, its spindle may be journaled in an eccentric bushing 884 (Fig. 44), which is capable of being fixed in varying angular positions. The adjustment of this bushing will cause the axis of the brush to be raised or lowered, and thus the relation of the ends of the fibers to the strip to be altered. The applying membr 858 may be provided with a like adjustment, which is of especial utility in arranging the correct initial positions of the peripheries of the disks 868.

Contacting with the button-bodies as they travel along the support 134 is a pressure member, which, as herein illustrated, consists of a belt 886 having its lower run parallel to the button-supporting surface 134. The belt operates over pulleys 888, 890, carried respectively upon shafts 892, 894 journaled at opposite extremities of a carrier member 895. The shaft 892 is connected by belt-gearing 896 to the shaft 880, this mechanism driving the belt so that its lower run progresses in the same direction as do the buttons and at substantially the same speed. The shaft 894 is preferably mounted in slots in the casing, and is held in place therein by a nut 898. Adjustment of the shaft along the slot varies the tension of the belt to keep it practically parallel to the button-supporting surface. The carrier 895 is shown as supported upon screws 900 threaded into its lower portion and held in the position to which they may be adjusted by lock-nuts. The ends of these screws bear against the upper surface of the support 134, and, when turned, raise or lower the carrier to change the distance of the lower run of the belt from the button-support. This permits the pressure of the belt upon the button-heads to be correctly proportioned, and provides as well for effective co-operation with different size buttons. The upper portion of the carrier contains vertical slots, which receive studs 902, 902, these studs being mounted to turn eccentrically about screws 904, 904 entering the portion 228 of the staple-hopper. Upon the outer ends of the studs are hexagonal portions for convenience in turning them, after which they may be secured in place by setting up the screws 904. This causes an adjustment of the carrier 895 longitudinally of the button-support 134, changing the relation to the applying rolls 858 and 860 of the portions of the belt which are held down in co-operation with said rolls by a secondary pressure member or head 906. This head has downwardly curved ends, which bear against the upper face of the lower run of the belt 886, these ends being spaced from one another a distance equal to that between the applying rolls. It is supported upon a vertical stem 908, passing into an opening in the carrier and having threaded into it a screw 910, which also carries upon its exterior a nut 912 bearing upon the top of the carrier. An adjustment of the head toward and from the belt by means of the supporting screw and nut causes it to hold the pressure-surface of the belt at different distances from the applying surfaces of the rolls. The belt 886, guided by the curved ends of the head 906, not only holds the buttons and paper in a position to be best subjected to the action of the pressure and applying rolls 858 and 860, but also, by the travel of the belt in the same direction as the buttons, prevents the latter from tilting back upon the strip and tending with the staples to be torn out of the paper.

*Power-controlling devices.*

Figure 11:
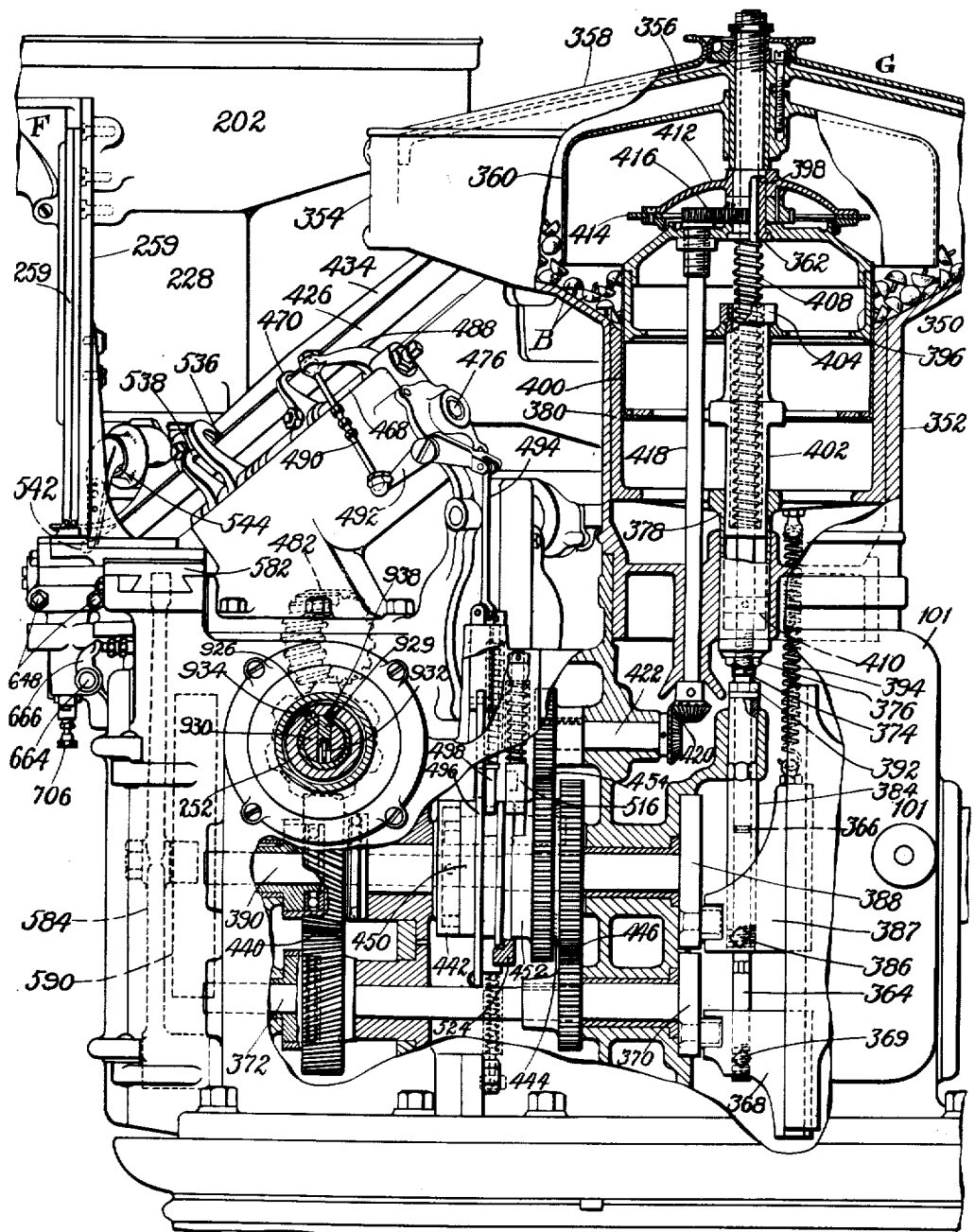
Fig. 11 is a broken end elevation, looking from the right in Fig. 3.

To enable the machine to be turned over by hand to facilitate adjustment or the clearing of clogged parts, the shaft 252 has normally turning freely about it a worm-wheel 920 (Figs. 3 and 5), this meshing with a worm 922 upon a short shaft 924 running from the front toward the rear of the machine and journaled in a casing 926 surrounding this gearing. The shaft 924 carries a hand-wheel 928, by which it may be turned by the operator. The outer end of the shaft 252 is recessed to receive a key or detent 929 pivoted in a slot in a plunger 930 movable longitudinally of the recess. The detent is forced by a spring 932 into a slot in the shaft for engagement with a key-way 934 within the hub of the worm-wheel 920. When the plunger 930 is forced into the recess by a finger-piece at its outer end, an inclined surface 936 upon the detent bears upon the end of the slot through which the detent passes, and cams the latter out of the key-way 934. At this time the gearing 920, 922 is without effect upon the actuating shaft 252, and the machine is in condition for power operation. When the plunger 930 is drawn outwardly by the finger-piece, the detent is released and carried by its spring into the key-way 934. Now rotation of the hand-wheel 928 turns the shaft 252 through the worm-gearing, as may be desired by the operator. If it were attempted to operate the machine under power while the detent 929 is in engagement with the worm-wheel, the elements would be locked and damage would result, were it not for the fact that the detent has on its edge entering the key-way 934 an inclined face 938 (Fig. 11). Rotation of the shaft 252 under power so forces the edge of the key-way against the incline, that the detent is carried out of said key-way by a cam action, releasing the worm-wheel and producing a clicking sound which will attract the attention of the operator.

It may be of advantage to separately control the operation of the staple-feeding mechanism to allow it to be cleaned or repaired, the remainder of the machine continuing in action while the staples gathered upon the race-way 258 are being used. To this end, the spiral-gearing 250, by which the staple-feeder is driven from the shaft 252, has associated with it a clutch mechanism 940 (Fig. 4), by which it may be connected to or disconnected from the shaft. One element of this clutch mechanism is carried by a sleeve 942 splined to the shaft 252 for longitudinal movement; and when this is drawn out of engagement with the companion clutch member carried by the spiral gearing, through the instrumentality of a lever 944 fulcrumed in the casing, the operation of the staple-feeder ceases, it being brought into action by opposite movement of the sleeve 942.

*Outline of the operation of the machine.*

Since not only the construction but the operation of the constituent mechanisms have already been described in detail, it will only be necessary to very briefly outline the action of the machine as a whole. Let it be assumed that a certain number of buttons B and their staples S have already been mounted upon a strip P, which therefore passes from the supply-reel C beneath the feed-roll 70 of the strip-advancing mechanism D and between it and the pressure-roll 76, upwardly from this mechanism between the race-way-section 130 and the mounting table 132, and over the button-support 134 to the winding reel 138 of the mechanism E, which is being frictionally turned to maintain the strip under a slight constant tension. The strip, it will be remembered, has already been provided with its button-receiving openings $x$, the staple-receiving openings $y$ in the corrugations $z$, and the strip-locating openings $w$, and also has preferably been sized to stiffen the co-operating lips of the openings $x$ and $y$. The staple-feeding mechanism F is in constant operation, delivering the contained staples to the race-way 258, but when this race-way is filled, acting without producing clogging, because of the ability of the staple-feeding brushes 302 to yield readily when any resistance such as is offered by the accumulated staples is presented to them. The elevating cylinder 380 of the button-feeder G is also in constant operation. But here, to avoid the clogging which would result by the uninterrupted action of the mechanism, the complete elevation of this member with the positioning cylinder 400 is not effected until the supply of the buttons upon the button-race-way 426 has reached a point below the field of action of the finger 470, which, when it is released by the absence of a button beneath it, will bring the button-feeding mechanism into full operative condition, and give an additional supply to the race-way 426. The fingers 536 and 538 have, it will further be assumed, acted alternately to release one button, which slides to the lower portion of the race-way 426 below the delivery-finger 542. This finger has, in its forward oscillation, engaged the thus released button, and has advanced and is holding it against the grooved portion 650 of the spindle 600 of the assembling mechanism H, the space 610 of which is alined with the groove 430 of the button-race-way. The bar 700 of the mounting mechanism is raised, so that its rounded end lies within the corrugation $z$, into which the next staple is to be inserted, and the finger 720 is in co-operation with this bar, pressing the side of the corrugation against it. In advance of these members, the strip is also positioned and clamped by the pin 804 and the arm 806. Now the bar 580, advancing from its extreme outward position, engages the bottom staple resting at the end of the race-way upon the bottom of the groove 260, and carries one leg through the eye $b$ of the button held in the assembling device against the spindle 600 by the finger 542. Having accomplished the insertion of the staple in the button-eye, the bar recedes sufficiently to clear the eye-grasping sleeve portions 602 and 604 and there rests. The finger 542 starts in its rearward oscillation also far enough to free the assembling mechanism, and the latter is rotated to bring the button-eye into alinement with the slot of the race-way-section 130. During this time, the recession of the finger 542 to its normal position continues. The button and staple being thus prepared for their advance to the mounting mechanism, the spindle 600 is lowered out of the path of the button-eye, and the bar 580 again moves forward, this time engaging the staple and thrusting its legs through the openings *y* in the corrugation held upon the bar 700 by the finger 720. While this is going on, the spindle 600 remains depressed. The staple having been inserted in the corrugation, and the button eye being over the opening *x* which it is to occupy, the strip P is ready for its advance to bring the next fastener-receiving area into the operating position. To allow this, the bar 700 is lowered, and while this is taking place, the sleeve-sections 602 and 604 of the assembling mechanism are restored to their initial position. The pin 804 is lowered clear of the strip-opening *w*, and simultaneously the arm 806 rises to release the strip from its hold. The strip being freed from all the engaging devices, save the finger 720, the bar 580 travels forward to the end of its stroke. This is for the purpose of causing the rod 728 upon its slide 582 to act upon the primary slide 726 carrying the finger 720, and also to bring the forward extremity of the bar 580 into co-operation with the finger to clamp the strip P between them. The slide 726 moves the finger from the position in which it co-operated with the bar 700 for the insertion of the staple, over the surface of the table 132 with the strip, which is being advanced by the rotation of the feed-roll 70, the tension of the reel 138 taking up the slack of the forward portion of the strip. The pressure between the finger 720 and the bar 580 traveling with it, and also, if desired, of the finger against the table 132, prevents the tension from being transmitted to the rearward portion of the strip, and thus relieves the corrugations from the flattening effect which would otherwise be exerted. This advance of the strip carries the just mounted button beneath the spring-finger 801, which presses its eye fully into the opening *x*. When the finger 720 reaches the forward extreme of its travel under the influence of the rod 728 upon the primary slide 726, this having carried the strip through a distance equal to the pitch distance between the fastener-receiving areas, the pin 804 rises into a new opening *w*, and by the action of its tapered end upon the strip may correct any errors in strip-position. It then, in its fully elevated relation, holds the strip in conjunction with the arm 806 which has now descended to press said strip against the table 132. The feed has been completed, and the secondary slide 724 carries the finger 720 forward an additional amount, said finger simultaneously turning in an anti-clockwise direction about the axis of its spindle 722 as viewed in Fig. 23, this freeing its grooves 721 from the staple-legs. This compound movement brings the finger into a position in which it may be withdrawn, it moving away from the strip, acted upon by the slide 764, until its end clears the corrugations thereof. While this is going on, the fingers 536, 538 act to release another button for engagement by the delivery finger 542, and the slide 582 with its rod 728 starts back toward its initial position, permitting the spring 732 to carry the primary slide and the finger 720 back toward the normal location. The travel of the primary slide does not, however, take the finger back the full distance, but the secondary slide 724 imparts to it an additional rearward travel. This places the finger 720 in the proper relation to move into co-operation with the bar 700, and it is projected over the strip and rotated clockwise; whereupon the bar rises to clamp the corrugation *w* between it and the finger. The bar 580 has passed beyond the table 132 and the space between it and the race-way-section 130, and continues back to its initial position. This clears the assembling mechanism, the spindle 600 of which rises above the top of the sleeve-sections 602 and 604. The finger 542 is now oscillating downwardly, and carries the released button against the raised spindle, the elements being thus ready for a succeeding operation. During each advance of the strip, some portion is carried over the support 134 to points above the applying members 858 and 860, which press up the lips of the openings *x*, apply sizing thereto and to the button-eyes, and also coat the entire under surface of the strip and the staple-legs with the sizing. The strip thereafter passes on to the reel 138, about which it is symmetrically wound by the combined rotary and axial movement. Whenever the supply of buttons held in the race-way 426 by the fingers 536 and 538 falls below the finger 470, the clutch-elements 450 and 452 are caused to rotate to complete the elevation of the cylinder 380 and the cylinder 400 to the feeding position, and to produce the sweeping therefrom of the positioned buttons by the annulus 414 into the button-race-way.

In the Letters Patent of the United States in the name of Albert Latham, No. 1,410,560, March 28, 1922, No. 1,513,831, November 4, 1924, and No. 1,605,354, November 2, 1926, are described and claimed certain features and methods of procedure disclosed but not claimed herein. Applications Serial No. 229,187 and Serial No. 229,188, both filed October 27, 1927, in the name of James W. Nourbourn, administrator of the estate of Albert Latham, deceased, disclose and claim the button-feeding apparatus and the staple-feeding apparatus, respectively, which have been divided out of the present case.

Having described the invention, what is claimed as new and is desired to be secured by Letters Patent of the United States is:

1. In a machine for arranging articles in groups on a temporary holder, means for assembling the articles in engagement with one another to furnish a group, and means independent of the assembling means arranged to insert a portion of the assembled group in the holder to permit its ready removal for utilization.

2. In a machine for arranging articles on a temporary holder, a plurality of receptacles for the articles, means arranged to assemble articles in engagement with one another, means for delivering articles from different receptacles to the assembling means, and means arranged to force one of the assembled articles through the holder while maintaining said articles in condition to be removed for utilization.

3. In a machine for arranging articles in groups on a holder, means for assembling the articles in engagement with one another to furnish groups, means acting after such assembly for mounting the groups upon the holder, and means arranged to successively apply tension to one extremity of the holder to position said holder at the mounting means to receive different groups.

4. In a machine for arranging articles in groups on a holder, a plurality of receptacles for the articles, article-assembling means, means for delivering articles from different receptacles to the assembling means, means for mounting the assembled group upon the holder, feeding means co-operating with the mounting means and arranged to apply tension to one extremity of the holder, and means acting upon the holder at the mounting point and arranged to facilitate the feed.

5. In a machine for arranging articles in groups on a holder, means for assembling the articles to furnish a group, means for mounting the assembled group upon the holder, and means acting upon the holder to secure therein the assembled and mounted articles.

6. In a machine for arranging articles in groups on a holder, a plurality of receptacles for the articles, article-assembling means, means for delivering articles from different receptacles to the assembling means, means for mounting the assembled group upon the holder, and means acting upon the holder to secure thereon the articles from both receptacles.

7. In a machine for arranging articles in groups on a holder, means for assembling the articles to furnish groups, means for mounting the assembled groups upon the holder, means for positioning the holder at the mounting means to receive different groups, and sealing means operating upon the positioned holder.

8. In a machine for arranging articles in groups on a holder, a plurality of receptacles for the articles, article-assembling means, means for delivering articles from different receptacles to the assembling means, means for mounting the assembled group upon the holder, holder-feeding means cooperating with the mounting means, and sealing means to which the holder is advanced by the feeding means.

9. In a machine for arranging articles on a holder to form a package, means for mounting articles upon the holder, and an adhesive applying member arranged for contact with the holder and with the articles mounted thereon.

10. In a machine for arranging articles on a holder to form a package, means for mounting articles upon the holder, and an adhesive applying member arranged for contact with the mounted articles.

11. In a machine for arranging articles on a holder to form a package, means for mounting articles upon the holder, and an adhesive-applying member arranged to press portions of the holder into cooperation with the articles.

12. In a machine for arranging buttons and their securing staples on a package-strip, means arranged to thread together a button and staple with a staple-leg through the button-eye, and means for bringing both the thus assembled button and staple into retaining engagement with the strip.

13. In a machine for arranging buttons and their securing staples on a package-strip, a button-hopper, a staple-hopper, means arranged to thread together a button and staple with a staple-leg through the button-eye, means for delivering buttons and staples from the hoppers to the threading means, and mounting means arranged to force the staple-legs and button-eyes through the strip.

14. In a machine for arranging buttons and their securing staples on a package-strip, means arranged to thread together a button and staple with a staple-leg through the button-eye, means for bringing both the thus assembled button and staple into retaining engagement with the strip, and means for advancing the strip to receive the buttons and staples on different areas.

15. In a machine for arranging buttons and their securing staples on a package-strip, a button-hopper, a staple-hopper, means arranged to thread together a button and staple with a staple-leg through the button-eye, means for delivering buttons and staples from the hoppers to the threading means, mounting means arranged to force the staple-legs and button-eyes through the strip, and means for feeding the strip into different positions with relation to the mounting means.

16. In a machine for arranging buttons and their securing staples on a package-strip, means arranged to thread together a button and staple with a staple-leg through the button-eye, means for mounting the thus assembled button and staple upon the strip, and means contacting with the strip to secure the buttons and staples thereon.

17. In a machine for arranging buttons and their securing staples on a package-strip, a button-hopper, a staple-hopper, means arranged to thread together a button and staple with a staple-leg through the button-eye, means for delivering buttons and staples from the hoppers to the threading means, and sealing means contacting with the strip at opposite sides of the button-eyes.

18. In a machine for arranging buttons on a package-strip, means for forcing the button-eyes through the strip, and means for applying an adhesive to the button-eyes.

19. In a machine for arranging buttons on a package-strip, means for forcing the button-eyes through the strip, and means for pressing the material of the strip into the button-eyes.

20. In a machine for arranging buttons and staples on a strip, means for forcing the button-eyes and staple-legs through the strip, and means for applying an adhesive to said button-eyes and staple-legs.

21. In a machine for mounting articles on formed portions of a holder, means for applying articles to the formed portions, means for applying tension to such formed portions to advance the holder to receive the applied articles, and means arranged to preserve the form of the portions prior to the application of the articles.

22. In a machine for mounting articles on a corrugated holder, means for applying articles to the corrugations, and means arranged for contact with the interior and exterior of the corrugations after their formation for preserving their form.

23. In a machine for mounting articles on a corrugated holder, means for applying member traveling with the holder and arranged to enter the previously formed corrugations to preserve their form.

24. In a machine for mounting articles on a corrugated holder, means for applying articles to the corrugations, means for feeding the holder to present different corrugations to the applying means, and a bodily movable member traveling with the holder and arranged to preserve the form of the corrugations during the feed of said holder.

25. In a machine for mounting articles on a corrugated holder, means for applying articles to the corrugations, means for retaining the holder in applying position, and means for feeding the holder to present different corrugations to the applying means, the applying and retaining means being movable together in co-operation during the feed of the holder to preserve the form of the corrugations.

26. In a machine for mounting articles on a corrugated holder, means for applying articles to the corrugations, and means for advancing the holder to present different corrugations to the applying means, said advancing means exerting tension upon the forward portion of the holder, there being provision for grasping the holder at the last applied article during its advance and arranged to relieve the tension upon the unutilized corrugations.

27. In a machine for arranging articles in successive positions on a holder, means contacting with an article to apply it to the holder, and means independent of the applying means for advancing the holder from position to position, the applying means being arranged to also exert an advancing force upon the holder.

28. In a machine for arranging articles in successive positions on a holder, an article-conveyor, and a reciprocatory member co-operating with the conveyor and arranged to advance articles therefrom and apply them to the holder and to continue its movement temporarily in the direction of advance of the holder into engagement therewith.

29. In a machine for arranging articles in successive positions on a holder, means for advancing the holder from position to position, means for applying an article to the holder at each position, and means for retaining the holder in applying position, the retaining means and applying means being movable together to grasp the holder during its advance.

30. In a machine for arranging staples in a series on a package-strip, means for forcing the staples through the strip, and means independent of the forcing means for feeding the strip for the reception of the series, the forcing means contacting with the staple during the feeding movement of the strip.

31. In a machine for mounting staples on successive corrugations of a package-strip, means for forcing the staples through the corrugations, means for feeding the strip to present the successive corrugations to the forcing means, and means contacting with the staples and arranged to preserve the form of the corrugations.

32. In a machine for arranging articles in successive positions on a holder, means applying pressure to an article to insert it in the holder, means for advancing the holder from position to position, and means for retaining the holder in position during the applying operation, said retaining means contacting with the holder at the point of application of the article and being movable with said holder during its advance.

33. In a machine for arranging articles in successive positions on a holder, means contacting with an article to apply it to the holder, means for advancing the holder from position to position, a support over which the advance occurs, a retaining member for the holder contacting therewith at one side of the area to which the article is to be applied and movable with the holder during its advance, and means for returning the retaining member to its initial position after each operation of the applying means.

34. In a machine for arranging articles in successive positions on a holder, means contacting with an article to apply it to the holder, means for advancing the holder from position to position, a support over which the advance occurs, and a traveling retaining member for the holder arranged to exert pressure on the holder in a plurality of directions during its advance over the support by contact with said holder in front of the area to which the article is applied.

35. In a machine for arranging articles in successive positions on a holder, means contacting with an article to apply it to the holder, means for advancing the holder from position to position, a support over which the advance occurs, and a retaining member movable in the direction of advance of the holder and arranged to exert pressure on the holder toward the support and to receive pressure exerted by the applying means during the advance of the holder over said support.

36. In a machine for arranging articles in successive positions on a holder, means contacting with an article to apply it to the holder, means for advancing the holder from position to position, a support over which the advance occurs, and a traveling retaining member for the holder arranged to exert pressure on the holder in co-operation with the applying means and toward the support during the advance of the holder over the support.

37. In a machine for arranging articles on a holder, members movable in directions substantially at right angles to each other into contact with opposite sides of the holder to clamp it between them and retain it in position, means actuated in the operation of the machine to move said members into clamping relation, and means for mounting an article on the positioned holder.

38. In a machine for arranging articles on a holder, members movable into contact with opposite sides of the holder to clamp it between them and retain it in position, means for mounting an article on the thus positioned holder, and means for advancing the holder, one of the retaining members being bodily movable with the holder in its advance.

39. In a machine for arranging articles on a holder, members movable into contact with opposite sides of the holder to clamp it between them and retain it in position, means for mounting an article on the thus positioned holder, and means for advancing the holder, one of the retaining members being movable with the holder in its advance and the companion member being arranged to travel away from the path of the holder.

40. In a machine for arranging articles on successive corrugations of a strip, an article-applying bar, feeding mechanism engaging the strip to present the corrugations to the action of the applying bar, and a retaining bar movable into and out of the corrugations thus positioned.

41. In a machine for arranging articles on successive corrugations of a strip, an article-applying bar, feeding mechanism engaging the strip to present the corrugations to the action of the applying bar, a retaining bar movable into and out of the corrugations thus positioned, and means arranged to vary the normal position of the retaining bar.

42. In a machine for arranging articles on successive corrugations of a strip, an article-applying bar, feeding mechanism engaging the strip to present the corrugations to the action of the applying bar, a retaining bar movable into and out of the corrugations thus positioned, and a strip-retaining finger contacting with a side of the corrugation over the bar.

43. In a machine for arranging articles on successive corrugations of a strip, an article-applying bar, feeding mechanism engaging the strip to present the corrugations to the action of the applying bar, a retaining bar movable into and out of the corrugations thus positioned, and a strip-retaining finger contacting with the corrugations, the applying bar being movable into co-operation with the finger during the withdrawal of the retaining bar.

44. In a machine for arranging articles on successive corrugations of a strip, an article-applying bar, feeding mechanism engaging the strip to present the corrugations to the action of the applying bar, a retaining bar movable into and out of the corrugations thus positioned, and means arranged to vary the normal relation of the applying bar to the retaining bar.

45. In a machine for arranging articles on the corrugation of a strip, a hopper, an article-applying member, a race-way for conveying articles from the hopper into co-operation with the applying member, and a plurality of retaining members between which the strip is grasped during the applying operation, one of said members being movable into the corrugation to which the article is being applied.

46. In a machine for arranging articles on the successive corrugations of a strip, a hopper, an article-applying member, a race-way for conveying articles from the hopper into co-operation with the applying member, a retaining member for co-operation with the applying member during the applying operation, feeding mechanism for advancing different corrugations of the strip to the retaining member, and means for moving the retaining member with the strip in its advance.

47. In a machine for arranging articles on the successive corrugations of a strip, a hopper, an article-applying member, a race-way for conveying articles from the hopper into co-operation with the applying member, a retaining member for co-operation with the applying member during the applying operation, feeding mechanism for advancing different corrugations of the strip to the retaining member, means for moving the retaining member with the strip in its advance, and a second retaining member movable into and out of the corrugation being acted upon by the applying member.

48. In a machine for applying articles to a strip, a member movable to apply the articles to the strip, means for advancing the strip, and a retaining member for the strip movable in the direction of advance of the strip under the influence of the applying member.

49. In a machine for applying articles to a strip, a member movable to apply the articles to the strip, means for advancing the strip for the application of different articles, and a retaining member for the strip movable during the advance of said strip under the influence of the applying member.

50. In a machine for applying articles to a strip, an article-applying bar, a movable carrier therefor having a projection, and a movable retaining member for the strip, the carrier-projection co-operating with the retaining member to move it.

51. In a machine for applying articles to a strip, a member movable to apply the articles to the strip, means for advancing the strip for the application of different articles, a retaining member for the strip movable during the advance of said strip under the influence of the applying member, a spring for holding the retaining member in its normal position, and an adjustable stop arranged to limit the movement of the retaining member under the influence of the spring.

52. In a machine for applying articles to a strip, an applying member, means for advancing the strip to receive the successive action of the applying member, a retaining member for the strip, the applying member and retaining member acting upon the strip during its advance, and a plurality of means arranged to impart independent movements to the retaining member in the direction of advance of the strip and in contact therewith.

53. In a machine for applying articles to a strip, an applying member, a retaining member for the strip, a plurality of means arranged to impart independent movements to the retaining member in the same direction in engagement with the strip, and means arranged to move the retaining member out of the plane of the just-mentioned movement.

54. In a machine for applying articles to a strip, a member movable to apply the articles to the strip, means for advancing the strip to receive the articles, a retaining member for the strip independent of the advancing means and movable with said strip in its advance, and means arranged to impart to the retaining means a compound movement to free an applied article with which it co-operates.

55. In a machine for applying articles to a strip, an applying member for the articles, means for exerting tension upon one extremity of the strip to effect its advance for the application of different articles, and a retaining member movable with the strip in its advance and into and out of co-operation with said strip.

56. In a machine for applying articles to a strip, an applying member for the articles, means for advancing the strip for the application of different articles, a retaining member movable with the strip in its advance and into and out of engagement with said strip, and yieldable means for effecting the last-mentioned movement.

57. In a machine for applying articles to a strip, an applying member for the articles, means for advancing the strip for the application of different articles, and a retaining member movable with the strip in its advance and across the width of said strip into and out of co-operation therewith.

58. In a machine for applying articles to a strip, an applying member for the articles, means for advancing the strip for the application of different articles. a retaining member movable with the strip in its advance and laterally into and out of co-operation with said strip, and means arranged to vary the position to which the retaining member moves across the strip.

59. In a machine for applying articles to a strip, an applying member for the articles, means for advancing the strip for the application of different articles, and a retaining member movable with the strip in its advance and revoluble into and out of co-operation with an article on the strip.

60. In a machine for applying articles to a strip, an applying member for the articles, means for advancing the strip for the application of different articles, and a retaining member movable with the strip in its advance in a plurality of steps of different lengths and into and out of co-operation with said strip.

61. In a machine for applying articles to a strip, an applying member for the articles, means for advancing the strip for the application of different articles, and a retaining member movable with the strip in its advance and revoluble out of co-operation with an article on the strip.

62. In a machine for applying articles to a strip, an applying member for the articles, and a retaining member movable into and out of co-operation with an article on the strip and independently movable into and out of co-operation with the strip.

63. In a machine for applying articles to a strip, an applying member for the articles, means for advancing the strip for the application of different articles, and a retaining member movable with the strip, revoluble out of co-operation with an article on the strip and movable into and out of co-operation with the strip.

64. In a machine for applying articles to a strip, means for advancing the strip, an article-applying member, a contact finger movable transversely of and with the strip, a plurality of slides by which the finger is carried, and means arranged to impart independent movements to the slides in the direction of advance of the strip.

65. In a machine for applying articles to a strip, an article-applying member, a finger co-operating with the strip, a plurality of slides by which the finger is carried, and means arranged to impart independent movements to the slides in the same direction.

66. In a machine for applying articles to a strip, an article-applying member, a finger co-operating with the strip, a plurality of slides by which the finger is carried, and means arranged to impart independent movements to the slides, said means including an actuating slide and connections between the actuating and carrying slides.

67. In a machine for applying articles to a strip, an article-applying member, a primary slide, a secondary slide movable upon the primary slide, a member carried upon the secondary slide for engagement with the strip, means arranged to move the primary and secondary slides independently of each other, and means for moving the member on one of the slides.

68. In a machine for applying articles to a strip, an article-applying member, means for advancing the strip in successive steps to receive different articles, a primary slide, a secondary slide movable upon the primary slide, a member carried by the secondary slide for co-operation with the strip, means arranged to move the primary slide a distance corresponding to the advance of the strip, and means for moving the secondary slide a less distance.

69. In a machine for applying articles to a strip, an article-applying member, means for advancing the strip in successive steps to receive different articles, a primary slide, a secondary slide movable upon the primary slide, a member carried by the secondary slide for co-operation with the strip, means actuated with the applying member and arranged to move the primary slide a distance corresponding to the advance of the strip, and means for moving the secondary slide a less distance.

70. In a machine for applying articles to a strip, an article-applying member, a finger co-operating with the strip, means for moving the finger axially into and out of co-operation with the strip, and means for turning the finger in engagement with the strip.

71. In a machine for applying articles to a strip, an article-applying member, means for advancing the strip, a finger co-operating with the strip, means for moving the finger laterally in the line of travel of the strip, and means for moving said finger axially across the width of the strip.

72. In a machine for applying articles to a strip, a support for the strip, an article-applying member, a member contacting with the strip upon the support during the application of the article, a slide on which the member is movably mounted, means for moving the slide longitudinally of the strip, and means for moving the member on the slide transversely of the strip and out of contact therewith.

73. In a machine for applying articles to a strip, an article-applying member, a movable finger contacting with the strip and having a depression to receive the applied articles under the influence of the applying member, and means for moving the finger to separate the depression from the articles.

74. In a machine for applying articles to a strip, an article-applying member, a finger co-operating with the strip, a slide on which the finger is mounted to turn, means for reciprocating the slide, and means for revolving the finger upon the slide about a center outside the axis of the finger.

75. In a machine for applying articles to a strip, an article-applying member, a finger co-operating with the strip, means for advancing the strip in successive steps to receive different articles, a finger co-operating with the strip, a slide on which the finger is mounted, means for reciprocating the slide in the direction of travel of the strip, means for reciprocating the finger upon the slide, and means for moving the finger upon the slide independently of its reciprocation.

76. In a machine for applying articles to a strip, an article-applying member, a finger co-operating with the strip, means for advancing the strip in successive steps to receive different articles, a finger co-operating with the strip, a slide on which the finger is mounted, means for reciprocating the slide in the direction of travel of the strip, and means for revolving the finger upon the slide.

77. In a machine for applying articles to a strip, an article-applying member, a finger co-operating with the strip, means for advancing the strip in successive steps to receive different articles, a finger co-operating with the strip, a slide on which the finger is mounted, means for reciprocating the slide in the direction of travel of the strip, an auxiliary slide movable adjacent to the finger-carrying slide, and connections between the auxiliary slide and finger.

78. In a machine for applying articles to a strip, an article-applying member, a finger co-operating with the strip, means for advancing the strip in successive steps to receive different articles, a finger co-operating with the strip, a slide on which the finger is mounted, means for reciprocating the slide in the direction of travel of the strip, an auxiliary slide movable adjacent to the finger-carrying slide, and connections including a spring between the auxiliary slide and finger.

79. In a machine for applying articles to a strip, an article-applying member, a finger co-operating with the strip, means for advancing the strip in successive steps to receive different articles, a finger co-operating with the strip, a slide on which the finger is mounted, means for reciprocating the slide in the direction of travel of the strip, an auxiliary slide movable adjacent to the finger-carrying slide, connections including a yieldable actuator between the auxiliary slide and finger, and means arranged to vary the normal relation between the actuator and finger.

80. In a machine for applying articles to a strip, an article-applying member, a finger co-operating with the strip, means for advancing the strip in successive steps to receive different articles, a finger co-operating with the strip, a slide on which the finger is mounted, means for reciprocating the slide in the direction of travel of the strip, an auxiliary slide movable adjacent to the finger-carrying slide, and connections including toothed gearing between the auxiliary slide and finger.

81. In a machine for applying articles to a strip, an article-applying member, a finger co-operating with the strip, means for advancing the strip in successive steps to receive different articles, a finger co-operating with the strip, a slide on which the finger is mounted, means for reciprocating the slide in the direction of travel of the strip, a plurality of auxiliary slides movable adjacent to the finger-carrying slide, and connections between the auxiliary slides and finger.

82. In a machine for applying articles to a strip, an article-applying member, a finger co-operating with the strip, means for advancing the strip in successive steps to receive different articles, a finger co-operating with the strip, a slide on which the finger is mounted, means for reciprocating the slide in the direction of travel of the strip, a plurality of auxiliary slides movable adjacent to the finger-carrying slide, and connections between the auxiliary slides and finger arranged to reciprocate and revolve said finger.

83. In a machine for applying articles to a strip, an article-applying member, a primary slide, a secondary slide movable upon the primary slide, a finger carried upon the secondary slide for co-operation with the strip, means arranged to move the primary and secondary slides independently of each other, a plurality of auxiliary slides movable adjacent to the primary and secondary slides, and connections between the auxiliary slides and finger.

84. In a machine for arranging articles on a holder, article-applying means, means for moving the holder to bring different areas into co-operation with the applying means, and means arranged to pass through the holder and present the co-operating areas in correct relation to the applying means.

85. In a machine for arranging articles on a holder, article-applying means, means for moving the holder to bring different areas into co-operation with the applying means, and means arranged to pass through and thereby move the holder to present the co-operating areas in correct relation to the applying means and to maintain this relation and thus retain the holder during the applying operation.

86. In a machine for arranging articles on a holder, said holder being provided with a series of openings, means arranged to apply articles between the openings, and a retaining member arranged to pass through the holder-openings.

87. In a machine for arranging articles on a holder, said holder being provided with an opening, article-applying means, and a retaining member acting independently of the applying means and arranged to pass through the holder-opening and exert lateral pressure upon the holder.

88. In a machine for arranging articles on a holder, article-applying means, means for moving the holder to bring different areas into co-operation with the applying means, means arranged to move the holder to present the co-operating areas in correct relation to the applying means, and means for clamping the thus positioned holder for the applying operation.

89. In a machine for arranging articles on a holder, article-applying means, means for moving the holder to bring different areas into co-operation with the applying means, means arranged to move the holder to present the co-operating areas in correct relation to the applying means, and yieldable means for clamping the thus positioned holder for the applying operation.

90. In a machine for arranging articles on a holder, article-applying means, means for moving the holder to bring different areas into co-operation with the applying means, a member movable into contact with the holder to present the co-operating area in correct relation to the applying means, and means arranged to hold the member in different relations to the holder.

91. In a machine for arranging articles on a holder, article-applying means, means for moving the holder to bring different areas into co-operation with the applying means, a member movable into contact with the holder to present the co-operating area in correct relation to the applying means, and means arranged to move the member parallel to the holder.

92. In a machine for arranging articles on a holder, article-applying means, means for moving the holder to bring different areas into co-operation with the applying means, a member movable into contact with the holder to present the co-operating area in correct relation to the applying means, and means arranged to hold the member in different angular positions with relation to the holder.

93. In a machine for arranging articles on a holder, said holder being provided with an opening, article-applying means, a retaining member arranged to pass through the holder-opening and retain the holder against movement during the applying operation, a clamping member arranged to contact with the holder about the opening, and means for actuating the applying means while the holder is thus clamped.

94. In a machine for arranging articles on a holder, article-applying means, means for moving the holder to bring different areas into co-operation with the applying means, means arranged to move the holder to present the co-operating areas in correct relation to the applying means, and means for clamping the thus positioned holder for the applying operation, the retaining and clamping means being movable together into co-operation with the holder.

95. In a machine for arranging articles on a strip, an article-applying member co-operating with the strip, means for intermittently feeding the strip to the applying member, a movable locating pin, and means arranged to move the pin into contact with the strip during the intermittencies of feed only and out of contact with said strip to permit the feed.

96. In a machine for arranging articles on a strip, said strip being provided with openings, an article-applying member co-operating with the strip, means for intermittently feeding the strip to the applying member, and a pin having a tapered end movable into the openings and held at all times against movement in the feed of the strip.

97. In a machine for arranging articles on a strip, an article-applying member co-operating with the strip, means for intermittently feeding the strip to the applying member, a locating pin movable into contact with the strip during the intermittencies of feed, and an arm having a portion movable into contact with the strip in proximity to the pin.

98. In a machine for arranging articles on a strip, said strip being provided with openings, article-applying mechanism co-operating with the strip, means for feeding the strip to the applying mechanism, a table over which the strip is fed, a pin movable through the table into the openings, and an arm movable to force the strip against the table adjacent to the pin.

99. In a machine for arranging articles on a strip, an article-applying member co-operating with the strip, means for intermittently feeding the strip to the applying member, a locating pin movable into contact with the strip during the intermittencies of feed, and a finger co-operating with the applying member during the applying operation and arranged to travel with the strip during its feed.

100. In a machine for arranging articles on a strip, an article-applying member co-operating with the strip, means for intermittently feeding the strip to the applying member, a locating pin movable into contact with the strip during the intermittencies of feed, a finger co-operating with the applying member during the applying operation and arranged to travel with the strip during its feed, and means for moving the finger into and out of engagement with the strip at its extremes of travel.

101. In a machine for arranging articles on a strip, an article-applying member co-operating with the strip, means for intermittently feeding the strip to the applying member, a locating pin movable into contact with the strip during the intermittencies of feed, a finger co-operating with the applying member during the applying operation and arranged to travel with the strip during its feed, means for moving the finger into and out of engagement with the strip at its extremes of travel, and means for turning the finger to change its relation to the articles.

102. In a machine for arranging articles on a strip, an article-applying member co-operating with the strip, means for intermittently feeding the strip to the applying member, a locating pin movable into contact with the strip during the intermittencies of feed, an arm having a portion movable into contact with the strip in proximity to the pin, actuating mechanism for the pin, and connections including a spring between the actuating mechanism and arm.

103. In a machine for arranging articles on a strip, an article-applying member co-operating with the strip, means for intermittently feeding the strip to the applying member, a locating pin movable into contact with the strip during the intermittencies of feed, actuating mechanism including a pin-support, and means arranged to hold the pin at different angles on the support.

104. In a machine for arranging articles on a strip, an article-applying member co-operating with the strip, means for intermittently feeding the strip to the applying member, a locating pin movable into contact with the strip during the intermittencies of feed, actuating mechanism including a pin-support, and means arranged to move the support substantially parallel to the strip.

105. In a machine for mounting different kinds of articles on a strip, a retaining member contacting with the strip for the mounting operation, means for intermittently feeding the strip to the retaining member, hoppers and raceways leading therefrom to deliver different kinds of articles, movable article-assembling mechanism situated between the delivery ends of the race-ways and the retaining member, and a member movable independently of the assembling mechanism and co-operating with the assembled articles to advance them from the assembling mechanism to the retaining member and apply them to the strip.

106. In a machine for mounting different kinds of articles on a strip, a retaining member contacting with the strip for the mounting operation, means for intermittently feeding the strip to the retaining member, hoppers and race-ways leading therefrom to deliver different kinds of articles, article-assembling mechanism situated between the delivery ends of the race-ways and the retaining member, a reciprocatory member co-operating with a race-way, and means for moving the reciprocatory member to advance an article from the race-way to the assembling mechanism, changing the rate of movement of said member at the assembling mechanism and thereafter moving the member to advance the assembled articles from the assembling mechanism to the retaining member.

107. In a machine for mounting different kinds of articles on a strip, a retaining member contacting with the strip for the mounting operation, means for intermittently feeding the strip to the retaining member, hoppers and race-ways leading therefrom to deliver different kinds of articles, article-assembling mechanism situated between the delivery ends of the race-ways and the retaining member, a movable member co-operating with the assembled articles to advance them from the assembling mechanism to the retaining member and apply them to the strip, and a member movable into contact with the strip after its feed and before subsequent mounting of the articles.

108. In a machine for mounting different kinds of articles on a strip, a table, means for intermittently feeding the strip over the table, a retaining member contacting with the strip at one extremity of the table and co-operating with said table in the advance of the strip, hoppers and race-ways leading therefrom to deliver different kinds of articles, article-assembling mechanism situated between the delivery ends of the race-ways and the retaining member, and a reciprocatory bar co-operating with the assembled articles constructed and arranged to advance them from the assembling mechanism to the retaining member and to insert them in the strip.

109. In a machine for mounting different kinds of articles on a strip, a table, means for intermittently feeding the strip over the table, a retaining member contacting with the strip at one extremity of the table, hoppers and race-ways leading therefrom to deliver different kinds of articles, article-assembling mechanism situated between the delivery ends of the race-ways and the retaining member, and a reciprocatory bar co-operating with the assembled articles to advance them from the assembling mechanism to the retaining member and apply them to the strip and thereafter advancing with the strip in its feed over the table.

110. In a machine for mounting different kinds of articles on a strip, a table, means for intermittently feeding the strip over the table, a retaining member contacting with the strip at one extremity of the table and movable in co-operation with the strip on the table, hoppers and race-ways leading therefrom to deliver different kinds of articles, article-assembling mechanism situated between the delivery ends of the race-ways and the retaining member, and a reciprocatory bar co-operating with the assembled articles to advance them from the assembling mechanism to the retaining member and apply them to the strip.

111. In a machine for mounting different kinds of articles on a strip, a table, means for intermittently feeding the strip over the table, an arm movable to clamp the strip upon the table, a retaining member contacting with the strip at one extremity of the table, hoppers and race-ways leading therefrom to deliver different kinds of articles, article-assembling mechanism situated between the delivery ends of the race-ways and the retaining member, and a reciprocatory bar co-operating with the assembled articles to advance them from the assembling mechanism to the retaining member and apply them to the strip.

112. In a machine for mounting different kinds of articles on a strip, article-assembling mechanism, race-ways delivering articles for assembling, a reciprocatory member co-operating with the assembled articles to insert them in the strip, means for intermittently feeding the strip, and a rotatable pressure member contacting with the strip during its feed and in close proximity to the points at which they are inserted.

113. In a machine for mounting different kinds of articles on a strip, article-assembling mechanism, race-ways delivering articles for assembling, a movable member co-operating with the assembled articles to apply them to the strip, means for intermittently feeding the strip, an adhesive-tank along which the strip with the articles mounted thereon is fed, and an applying member operating in the tank and contacting with the strip and with the articles thereon.

114. In a machine for mounting different kinds of articles on a strip, article-assembling mechanism, race-ways delivering articles for assembling, a reciprocatory member co-operating with the assembled articles to apply them to the strip, means for intermittently feeding the strip, a rotatable pressure member contacting with the strip during its feed and with the applied articles, and an adhesive tank in which the pressure member operates.

115. In a machine for arranging articles on a holder, means for applying a liquid to the holder in proximity to the articles, and means for applying a liquid over a more extended surface of the holder.

116. In a machine for arranging articles on a holder, a liquid-container, and means co-operating with the container for applying liquid therefrom to the holder and for pressing the holder into co-operation with the articles.

117. In a machine for arranging articles on a holder, a liquid-container, means co-operating with the container for applying liquid therefrom to the holder and for pressing the holder into co-operation with the articles, and means for applying liquid from the container to the articles and to previously treated portions of the holder.

118. In a machine for arranging articles on a holder, a contact member having separated portions arranged to engage the holder at opposite sides of the articles, means for moving the holder to carry the articles between such portions, and means for applying a liquid to the portions.

119. In a machine for arranging articles on a holder, a contact member having separated yieldable portions arranged to engage the surface of the holder from which the articles project and at opposite sides of said articles, and means for moving the holder to carry the articles between such portions.

120. In a machine for arranging articles on a holder, a liquid-applying member having separated portions arranged to contact with the holder at opposite sides of the articles, means arranged to supply liquid between the separated portions, and means for moving the holder to carry the articles between such portions.

121. In a machine for arranging articles on a holder, mounting means, a contact member, means for moving the holder from the mounting means in co-operation with the contact member, and a member traveling with the holder to retain said holder in position to receive the action of the contact member.

122. In a machine for arranging articles on a holder, mounting means, a contact member, means for moving the holder from the mounting means in co-operation with the contact member, and a member traveling with the holder and in contact with the articles thereon to retain said holder in position to receive the action of the contact member.

123. In a machine for arranging articles on a holder, mounting means, a contact member, means for moving the holder from the mounting means in co-operation with the contact member, a member traveling with the holder to retain said holder in position to receive the action of the contact member, and means contacting with the traveling member to determine its relation to the holder.

124. In a machine for arranging articles on a holder, mounting means, a contact member, means for moving the holder from the mounting means in co-operation with the contact member, a member traveling with the holder to retain said holder in position to receive the action of the contact member, and normally fixed means in contact with which the member travels, said means being arranged to determine the relation of the traveling member to the holder.

125. In a machine for arranging articles on a holder, mounting means, a contact member, means for moving the holder from the mounting means in co-operation with the contact member, a member traveling with the holder to retain said holder in position to receive the action of the contact member, normally fixed means in contact with which the member travels, said means being arranged to determine the relation of the traveling member to the holder, and means arranged to vary the effective position of the relation-determining means.

126. In a machine for arranging articles on a holder, mounting means, a contact member, means for moving the holder from the mounting means in co-operation with the contact member, a member traveling with the holder to retain said holder in position to receive the action of the contact member, and normally fixed means in contact with which the member travels, said means being arranged to move toward and from the traveling member to determine the relation of said traveling member to the holder.

127. In a machine for arranging articles on a holder, mounting means, a contact member, means for moving the holder from the mounting means in co-operation with the contact member, a member traveling with the holder to retain said holder in position to receive the action of the contact member, and normally fixed means in contact with which the member travels, said means being arranged to determine the relation of the traveling member to the holder at varying points in the direction of travel.

128. In a machine for arranging articles on a holder, a liquid-applying member, means for moving the holder in co-operation with the applying member, a member traveling with the holder to retain said holder in position to receive the action of the applying member, and a pressure member contacting with the traveling member at the side opposite the applying member and in proximity thereto.

129. In a machine for arranging articles on a holder, a plurality of liquid-applying members, means for moving the holder in contact with the applying members, a member traveling with the holder to retain said holder in position to receive the action of the applying members, and a pressure member contacting with the traveling member at points approximately opposite the applying members.

130. In a machine for arranging buttons on a package-strip with their eyes projecting through said strip, a button-support having an opening through which the button-eyes extend, means arranged to feed the buttons and strip along opposite sides of the support, a liquid-container, and a member receiving liquid from the container and arranged to apply liquid to the button-eyes and strip.

131. In a machine for arranging buttons on a package-strip with their eyes projecting through said strip, a button-support having an opening through which the button-eyes extend, means arranged to feed the buttons and strip along opposite sides of the support, a liquid-container, and a member receiving liquid from the container and arranged to apply liquid to the button-eyes and strip and to press the strip toward the support along the button-eyes.

132. In a machine for arranging buttons on a package-strip with their eyes projecting through said strip, a button-support having an opening through which the button-eyes extend, means arranged to feed the buttons and strip along opposite sides of the support, means for holding the button-heads in contact with the support during their advance, a liquid-container, and a member receiving liquid from the container and arranged to apply liquid to the button-eyes and strip.

133. In a machine for arranging buttons on a package-strip with their eyes projecting through said strip, a button-support having an opening through which the button-eyes extend, means arranged to feed the buttons and strip along opposite sides of the support, means traveling with the buttons for holding the button-heads in contact with the support during their advance, a liquid-container, and a member receiving liquid from the container and arranged to apply liquid to the button-eyes and strip.

134. In a machine of the class described, a liquid-applying member having a body-portion, yieldable disks mounted thereon and converging toward one another to furnish adjacent applying edges spaced from each other, and means for rotating the applying member.

135. In a machine of the class described, a liquid-applying member having a body-portion, yieldable disks mounted thereon and converging toward one another to furnish adjacent applying edges, means for rotating the applying member, and a liquid-feeding member extending between the edges of the disks.

136. In a machine of the class described, a liquid-applying member, means for moving the work along the applying member, and a belt movable in contact with the work.

137. In a machine of the class described, a liquid-applying member, means for moving the work along the applying member, a belt contacting with the work, and means for moving the contact-surface of the belt at the same speed as the work.

138. In a machine of the class described, a liquid-applying member, means for moving the work along the applying member, a belt contacting with the work, means for moving the contact-surface of the belt at the same speed as the work, and a pressure member contacting with the belt at the side opposite the applying member and in proximity thereto.

139. In a machine of the class described, a liquid-container, a plurality of applying rolls rotatable therein, a support extending above the container, means for moving the work along the support in contact with the rolls, and a belt traveling in contact with the work above the support.

140. In a machine of the class described, a liquid-container, a plurality of applying rolls rotatable therein, a support extending above the container, means for moving the work along the support in contact with the rolls, a belt traveling in contact with the work above the support, and pressure means acting upon the belt opposite each applying roll.

141. In a machine for arranging articles on a strip having a series of definitely spaced openings, means for mounting the articles on the strip, and rotatable means engaging the strip-openings at the side of the mounting means from which the strip advances for feeding the strip to the mounting means in steps equal to the spaces between the openings.

142. In a machine of the class described, strip-feeding means provided with spaced strip-engaging portions, co-operating rotatable driving members therefor, one of said members having a circular series of projections corresponding to the strip-engaging portions and another member having a movable detent, means for moving one of the members, and means for controlling the engagement of the detent and projections.

143. In a machine of the class described, a rotatable strip-feeding roll provided with strip-engaging pins, a disk rotatable with the roll and having projections corresponding to the pins, a rotatable driving member having a detent cooperating with the projections, and a relatively fixed cam arranged to control engagement between the detent and projections.

144. In a machine of the class described, a rotatable strip-feeding roll, a disk having projections rotatable with the roll, a rotatable driving member having a detent co-operating with the projections, a relatively fixed cam arranged to control engagement between the detent and projections, and a brake device co-operating with the disk.

145. In a machine for arranging articles on a strip, means for mounting the articles on the strip, a rotatable reel for receiving the strip from the mounting means, means positively engaging the strip to feed it step by step to the mounting means, and frictional means for rotating the reel.

146. In a machine for arranging articles on a strip, means for mounting the articles on the strip, a rotatable reel for receiving the strip from the mounting means, a rotatable member having projections arranged to enter the strip and feed it step by step to the mounting means, a rotatable reel to receive the strip from the mounting means, and frictional means for rotating the reel.

147. In a machine for arranging articles on a strip, means for mounting the articles on the strip, a rotatable reel by which the strip with its mounted articles is received, and means rotatable in opposite directions and arranged to reciprocate the reel axially to dispose the strip symmetrically about said reel.

148. In a machine of the class described, mounting mechanism, means for advancing a holder to the mounting mechanism, a reel, means for rotating the reel, rotatable means for moving the reel transversely to the direction of advance of the holder, and means effective in the transverse movement for reversing the direction of rotation of the moving means and the travel of the reel.

149. In a machine of the class described, mounting mechanism, means for advancing a holder to the mounting mechanism, a reel, means for rotating the reel, means for moving the reel transversely to the direction of advance of the holder including oppositely rotating gearing, a clutch interposed between the gearing and reel, and means made effective in the transverse movement for shifting the clutch.

In testimony whereof I have signed my name to this specification.

JAMES W. NOURBOURN,
*Administrator of the Estate of Albert Latham, Deceased.*

---

CERTIFICATE OF CORRECTION.

Patent No. 1,681,244.　　　　　　　　　Granted August 21, 1928, to

JAMES W. NOURBOURN, Administrator of ALBERT LATHAM, deceased.

It is hereby certified that error appears in the printed specification of the above numbered patent requiring correction as follows: Page 9, strike out line 75, and insert instead "ber 456, which has been resting against the"; page 20, line 40, claim 23, strike out the words "member traveling with the holder and" and insert instead "articles to the corrugations, and means"; and that the said Letters Patent should be read with these corrections therein that the same may conform to the record of the case in the Patent Office.

Signed and sealed this 18th day of June, A. D. 1929.

(Seal)　　　　　　　　　　　　　　　　M. J. Moore,
　　　　　　　　　　　　　　　Acting Commissioner of Patents.

rotatable strip-feeding roll provided with strip-engaging pins, a disk rotatable with the roll and having projections corresponding to the pins, a rotatable driving member having a detent cooperating with the projections, and a relatively fixed cam arranged to control engagement between the detent and projections.

144. In a machine of the class described, a rotatable strip-feeding roll, a disk having projections rotatable with the roll, a rotatable driving member having a detent co-operating with the projections, a relatively fixed cam arranged to control engagement between the detent and projections, and a brake device co-operating with the disk.

145. In a machine for arranging articles on a strip, means for mounting the articles on the strip, a rotatable reel for receiving the strip from the mounting means, means positively engaging the strip to feed it step by step to the mounting means, and frictional means for rotating the reel.

146. In a machine for arranging articles on a strip, means for mounting the articles on the strip, a rotatable reel for receiving the strip from the mounting means, a rotatable member having projections arranged to enter the strip and feed it step by step to the mounting means, a rotatable reel to receive the strip from the mounting means, and frictional means for rotating the reel.

147. In a machine for arranging articles on a strip, means for mounting the articles on the strip, a rotatable reel by which the strip with its mounted articles is received, and means rotatable in opposite directions and arranged to reciprocate the reel axially to dispose the strip symmetrically about said reel.

148. In a machine of the class described, mounting mechanism, means for advancing a holder to the mounting mechanism, a reel, means for rotating the reel, rotatable means for moving the reel transversely to the direction of advance of the holder, and means effective in the transverse movement for reversing the direction of rotation of the moving means and the travel of the reel.

149. In a machine of the class described, mounting mechanism, means for advancing a holder to the mounting mechanism, a reel, means for rotating the reel, means for moving the reel transversely to the direction of advance of the holder including oppositely rotating gearing, a clutch interposed between the gearing and reel, and means made effective in the transverse movement for shifting the clutch.

In testimony whereof I have signed my name to this specification.

JAMES W. NOURBOURN,
*Administrator of the Estate of Albert Latham, Deceased.*

---

CERTIFICATE OF CORRECTION.

Patent No. 1,681,244.      Granted August 21, 1928, to

JAMES W. NOURBOURN, Administrator of ALBERT LATHAM, deceased.

It is hereby certified that error appears in the printed specification of the above numbered patent requiring correction as follows: Page 9, strike out line 75, and insert instead "ber 456, which has been resting against the"; page 20, line 40, claim 23, strike out the words "member traveling with the holder and" and insert instead "articles to the corrugations, and means"; and that the said Letters Patent should be read with these corrections therein that the same may conform to the record of the case in the Patent Office.

Signed and sealed this 18th day of June, A. D. 1929.

(Seal)                                    M. J. Moore,
                                          Acting Commissioner of Patents.